(12) United States Patent
Kohda et al.

(10) Patent No.: US 7,953,629 B2
(45) Date of Patent: May 31, 2011

(54) ONLINE SALES PROMOTION METHOD AND DEVICE

(75) Inventors: Youji Kohda, Kawasaki (JP); Soichi Nishiyama, Kawasaki (JP); Koichi Murakami, Kawasaki (JP); Takaya Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 2330 days.

(21) Appl. No.: 09/766,646

(22) Filed: Jan. 23, 2001

(65) Prior Publication Data

US 2001/0053998 A1 Dec. 20, 2001

(30) Foreign Application Priority Data

Jun. 20, 2000 (JP) ................................ 2000-185157

(51) Int. Cl.
*G07G 1/14* (2006.01)
(52) U.S. Cl. ........................................................ 705/14
(58) Field of Classification Search ..................... 705/14; 709/250, 217
See application file for complete search history.

(56) References Cited

U.S. PATENT DOCUMENTS

| | | | | |
|---|---|---|---|---|
| 5,227,874 A * | 7/1993 | Von Kohorn | .................... | 705/10 |
| 5,636,346 A * | 6/1997 | Saxe | ................................ | 705/1 |
| 5,715,314 A | 2/1998 | Payne et al. | | |
| 5,794,207 A * | 8/1998 | Walker et al. | ..................... | 705/1 |
| 5,895,454 A | 4/1999 | Harrington | | |
| 5,931,917 A * | 8/1999 | Nguyen et al. | ................ | 709/250 |
| 5,978,773 A * | 11/1999 | Hudetz et al. | ..................... | 705/23 |
| 6,029,141 A * | 2/2000 | Bezos et al. | ..................... | 705/27 |
| 6,112,186 A * | 8/2000 | Bergh et al. | ..................... | 705/10 |
| 6,223,215 B1 * | 4/2001 | Hunt et al. | ..................... | 709/217 |
| 6,343,274 B1 * | 1/2002 | McCollom et al. | ............. | 705/26 |
| 6,625,581 B1 * | 9/2003 | Perkowski | ..................... | 705/27 |
| 7,016,864 B1 * | 3/2006 | Notz et al. | ..................... | 705/26 |
| 2001/0021914 A1 * | 9/2001 | Jacobi et al. | ..................... | 705/8 |
| 2004/0172343 A1 * | 9/2004 | Allibhoy et al. | ................ | 705/27 |
| 2005/0005242 A1 * | 1/2005 | Hoyle | ........................... | 715/745 |

* cited by examiner

*Primary Examiner* — Arthur Duran
(74) *Attorney, Agent, or Firm* — Staas & Halsey LLP

(57) ABSTRACT

The object of the invention is to perform a constructive exchange of information between a user and a provider of products in virtual reality. A user places a product 154 that he is considering buying in a cart, designates product providers, and gives notification thereto of the cart contents. A designated product provider 153, by seeing the cart contents, can learn in what products the user is interested. The product provider 153 can provide to the cart from which the designation arose additional information 155, such as advertisements for its products. The user, by receiving various types of additional information from a product provider that he trusts, can find products that meet his desires, and can enjoy more satisfactory network-based shopping.

25 Claims, 26 Drawing Sheets

| Cart ID | User ID |
|---|---|
| 5432 | Taro@fujitsu.co.jp |
| 5433 | Jiro@fujitsu.co.jp |
| 5434 | Taro@fujitsu.co.jp |

*Fig. 4A*

```
<store_list>
    <store sid=0123>
    <name>Akachanya</name>
    <icon  href="http://..."/>
        <address href="http://akachan-ya.com"/>
    </store>
    <store sid=0564>
    <name>Ningyo-no Satsukido</name>
    <icon  href="http://..."/>
        <address href="http://satsukido.com"/>
    </store>
    <store sid=0777>
    <name>Gift Honpo</name>
    <icon  href="http://..."/>
        <address href="http://honpo.com"/>
    </store>
    <store sid=989>
    <name>Sanjusando</name>
    <icon  href="http://..."/>
        <address href="http://33do.com"/>
    </store>
    <store sid=0019>
    <name>Kuma Honpo Co.</name>
    <icon  href="http://..."/>
        <address href="http://kuma.com"/>
    </store>
</store_list>
```

*Fig. 4B*

```
<item_list>
    <item id=1211>
    <name>Baby car type A</name>
    <icon href="http://..."/>
    </item>
    <item id=5235>
    <name>Dolls (2)</name>
    <icon href="http://..."/>
    </item>
    <item id=3333>
    <name>Giant bear</name>
    <icon href="http://..."/>
    </item>
</item_list>
```

*Fig. 5A*

| Store ID | Cart ID | Fee Amount | Date | Account |
|---|---|---|---|---|
| 0123 | 5432<br>5434 | ¥1200<br>¥600 | 2000/6/2<br>2000/6/3 | AbankXX 1<br>BbankXX 2 |
| 0124 | 5561<br>5700<br>5810 | ¥5200<br>¥240<br>¥2400 | 2000/5/30<br>2000/6/1<br>2000/6/1 | CbankZZ<br>AbankYY<br>BbankZZ |
| ⋮ | | | | |

*Fig. 5B*

●Settlement Information List

<paymentinfo>
  <credit id=1>
    <number>5250-XXXX-XXXX-XXXX</number>
    <holder>Taro Fuji</holder>
    <valid_through>"03/02"</valid_through>
    <description>MASTER</description>
  </credit>
  <credit id=2>
    <number>3584-XXXX-XXXX-XXXX</number>
    <holder>Taro Fuji</holder>
    <valid_through>"01/01"</valid_through>
    <description>JCB</description>
  </credit>
</paymentinfo>

*Fig. 6*

●Permission List

```
<permission_list>
    <permission>
        <store sid=0123>Akachanya</store>
        <address href="http://akacyan-ya.com/cart/taro/5432" />
    </permission>
    <permission>
        <store sid=0564>Ningyo-no Satsukido</store>
        <address href="http://satsukido.com/cart/taro/5432"/>
    </permission>
    <permission>
        <store sid=0777>Gift Honpo</store>
        <address href="http://honpo.com/cart/taro/5432"/>
    </permission>
</permission_list>
```

*Fig. 7*

● Example of Candidate Product List
{{id=3333, 12,000 yen, sid=<No Designation>}}

```
<wish_list>
    <item id=3333>
        <price>12000</price>
        <store> </store>
        Giant bear
    </item>
</wish_list>
```

*Fig. 8A*

● Example of Candidate Product List
{{id=3333, 10,000 yen, sid=<0019 >}}

```
<wish_list>
    <item id=3333>
        <price >10000</price>
        <store sid=0019>Kuma Honpo Co. </store>
        Giant bear
    </item>
</wish_list>
```

*Fig. 8B*

●A Conceptual Figure of the
Purchased Product List

```
<wish_list>
    <item id=1211>
    <price>23000</price>
    <store sid=0564>Ningyo-no Satsukido</store>
    Baby car type A
    </item>
    <item id=3333>
    <price >10000</price>
    <store sid=0019 > Kuma Honto Co.</store>
    Giant bear
    </item>
</wish_list>
```

●Candidate Product List Example

```
<settled_list>
    <item id=5235>
    <price>18000</price>
    <store sid=0989> Sanjusando</store>
    Dolls (2)
    </item>
</settled_list>
```

*Fig. 9*

●External Information List Example

```
<ad_list>
    <ad aid=222123>
        <store sid=0564>Ningyo-no Satsukido</store>
        <item id=5235>Dolls (2)</item>
        <ad_body>
            <html><head></head>
            <body>
            20% off sale now going on at Ningyo-no Satsukido
            </body></html>
        </ad_body>
    </ad>
</ad_list>
```

*Fig. 10*

●Fee-Charging List Example
{X Travel Company, 1,200 yen, ⟨fee payer information⟩,
 Y Travel, 300 yen, ⟨fee payer information⟩}

*Fig. 11A*

●Fee-Charging List Example
{Akachanya, 1,200 yen, ⟨*fee payer information* (ex. banker account etc.)⟩,
 Satsukido, 5,300 yen, ⟨*fee payer information* (ex. banker account etc.)⟩,
 Doll house, 240 yen, ⟨*fee payer information* (ex. banker account etc.)⟩}

*Fig. 11B*

```xml
<cart id=5432>
    <name>Congratulations on birth of grandchild</name>
    <category>Gifts</category>
    <wish_list>
        <item id=1211>
        <price>23000</price>
        <store sid=0564>Ningyo-no Satsukido</store>
        Baby car type A
        </item>
        <item id=3333>
        <price>10000</price>
        <store sid=0019>Kuma Honpo Co.</store>
        Giant bear
        </item>
    </wish_list>
    <settled_list>
        <item id=5235>
        <price>18000</price>
        <store sid=0989>Sanjusando </store>
        Dolls (2)
        </item>
    </settled_list>
    <ad_list>
        <ad aid=222123>
        <store sid=0564>Ningyo-no Satsukido</store>
        <item id=5235>Dolls (2)</item>
        <ad_body>
        <html><head></head>
        <body>
        20% off sale now going on at Ningyo-no Satsukido
        </body></html>
        </ad_body>
        </ad>
        <ad aid=222158>
        <store sid=0019>Kuma Honpo Co. </store>
        <item id=3333>Giant bear</item>
        <ad_body>
        <html><head></head>
        <body>
        Purchaser X: Very cute; my three-year-old daughter always sleeps with it
        </body></html>
        </ad_body>
        </ad>
        <ad aid=222157>
        <store sid=0989>Sanjusando </store>
        <item id=5235>Dolls (2)</item>
        <ad_body>
        <html><head></head>
        <body>
        <img src=... />Manufacturer's warranty
        </body></html>
        </ad_body>
        </ad>
    </ad_list>
    <permission_list>
        <permission>
        <store sid=0123>Akachanya</store>
        <address href="http://..."/>
        </permission>
        <permission>
        <store sid=0564>Ningyo-no Satsukido</store>
        <address href="http://..."/>
        </permission>
        <permission>
        <store sid=0777>Gift Honpo</store>
        <address href="http://..."/>
        </permission>
    </permission_list>
    <address href="http://cart.com/cart/5432"/ >
</cart>
```

Friday, April 21 [PURCHASE]

08:00–10:00
Travel by Bullet Train?→

10:00–12:00

12:00–14:00
Lunch at Osaka

14:00–16:00

16:00–18:00

18:00–
Lodgings?→

Presentation: X Travel Co., Y Travel

Fig. 21B

Friday, April 21 [PURCHASE]

08:00–10:00
Travel by Bullet Train?→ Shall We Make the Arrangements (X)!

10:00–12:00

12:00–14:00
Lunch at Osaka

14:00–16:00

16:00–18:00

18:00–
Lodgings?→ Hotel A (Y)! Hotel M (X)!

Presentation: X Travel Co., Y Travel

Friday, April 21 PURCHASE

08:00–10:00
Travel by Bullet Train: Hikari 100

10:00–12:00

12:00–14:00
Lunch at Osaka

14:00–16:00

16:00–18:00

18:00–
Lodgings: Hotel A

Presentation: X Travel Co., Y Travel

*Fig. 22*

| Product | Total Units Sold | Lowest Price | Highest Price | Most Common Price | Store Ranking |
|---|---|---|---|---|---|
| Digital Camera α | 467 | 11,100 Yen | 15,700 Yen | 13,900 Yen | X Denki, Y Shoten,.... |
| Video deck K | 3 | 32,000 Yen | 33,000 Yen | 32,000 Yen | Discount King Z,..... |

Fig. 24

ONLINE SALES PROMOTION METHOD AND DEVICE

BACKGROUND OF THE INVENTION

1. Technical Field

The present invention relates to technology for promoting the sale of products and services over a network. More specifically, it relates to technology for promoting the sale of products and services posted on a company web site over the Internet, and for supporting users purchasing products and services over the Internet.

2. Description of Related Art

As use of the Internet has grown, it has become increasingly common for users to purchases products and services (hereinafter referred to collectively as "products") over the Internet. In line with such societal changes, a number of different types of technologies have been proposed relating to the purchase of products over the Internet. The online shopping cart can be considered the most prominent of these technologies.

U.S. Pat. No. 5,715,314 describes a typical online shopping cart. This cart is placed on a corporate web site on which a group of products is posted. A user can temporarily place in this cart candidate products that he has selected from the group of products. This cart also manages settlement information; by activating a purchase button, the user can purchase at once all the candidate products. For example, when settlement information needs to be input into a web form, the cart refers to stored settlement information and automatically fills in the web form (auto-fill function). In addition, before activating the purchase button, the user can remove items from the cart that he decides that he does not want to buy. Candidate products will remain in the cart until the user visits the web site again.

However, U.S. Pat. No. 5,715,314 does not conceive of allowing for a cart on a company web site to accept products from a different company. In this regard, U.S. Pat. No. 5,895,454 discloses an online shopping cart that allows for products from a plurality of companies to be placed in a single shopping cart. This cart is placed on a portal site, and a user can place into a single cart products from companies affiliated with this portal site, and make comparisons of those products.

In addition, the following types of additional cart functions have been proposed.

1) By activating a compare button, a user can initiate a price comparison search of candidate products that he has placed in an online shopping cart. However, the range of the price comparison search is limited to the sites with which the companies supplying the online shopping cart are affiliated. By charging a handling fee to the affiliated sites, the company supplying the online shopping cart obtains revenue.

2) A user can use an online shopping cart as a gift registry. Specifically, the contents of an online shopping cart are disclosed to designated parties, who can purchase the products in the cart as gifts.

3) A user can set up a plurality of online shopping carts to be used for different purposes. For example, these can include "an online shopping cart for gifts for a grandchild" and "an online shopping cart for summer vacation travel plans."

4) An online shopping cart can be placed at a user terminal, so that even when offline a user can look at the online shopping cart and edit the contents thereof.

As described above, the original purpose of online shopping carts is the purchase of candidate items, but there is another important function, namely, the function of temporarily holding items about which a user is unsure whether to purchase or not. Even at an actual store, products that are placed in a shopping cart are sometimes returned unpurchased to the shelves after the shopper changes his mind. Survey results have shown that in a significant percentage of cases, products placed in online shopping carts are not eventually purchased.

Thus, regarding a product about which a user is unsure whether to purchase or not, if a party that provides products were able to place in a cart additional information which may promote a purchase by a user, that party would be able to advertise products that he knows interest the user. It is anticipated that this could lead to a significant expansion in sales. Given that users welcome the price comparison function of online shopping carts, it seems likely that users would welcome constructive suggestions from other companies. In fact, there are businesses that notify a plurality of companies that a user desires to make a purchase, and passes on to the user constructive sales suggestions from those companies, and these businesses are popular.

Of the conventional online shopping carts described above a company can view the contents of a shopping cart, when it is on the company web site. Thus, the company has the opportunity to make constructive sales suggestions. However, other companies cannot see the cart contents, and thus, are unable to make constructive sales suggestions. From the user's point of view, he is unable to compare products from a plurality of different companies.

When an online shopping cart is on a portal site, the portal site is able to show the cart contents to affiliated companies. However, because the desire to purchase can be considered the user's private information, there is a problem with the portal site showing the cart contents to companies or sending additional information such as advertisement information without the user's consent. Thus, it is necessary for the portal site and the user to enter into an agreement beforehand allowing the portal site to notify affiliated companies of the cart contents. But even in this case, the user has no ability to select the companies that will be notified of the cart contents and/or will send advertisements.

With the gift registry function, user A designates another user B, to whom the cart contents can be shown. But there is no system whereby user B is able to place additional information such as advertisements in that online shopping cart.

In addition, when an online shopping cart is on a user's personal computer, neither the portal site nor companies are able to view what is inside the cart. Therefore, they are unable to supply additional information that may be of use to the user.

As described above, with the conventional online shopping cart, no system is provided whereby constructive notification of a desire to purchase and suggestions in response to that notification can be exchanged between a cart owner and a third party.

SUMMARY OF THE INVENTION

It is an object of the present invention to provide technology to assist a user in purchasing a product and to promote expanded sales of a product by making it possible for a third party to add additional information to an online shopping cart within a range approved of by the owner of the cart.

In order to solve the above problems, the present invention in its first aspect is an online sales promotion method used in a system to purchase a product over a network. The method comprises steps of:

receiving product information on the product and designation information on a third party being able to supply additional information about the product from a first user;

associating the product information and designation information with cart identification information;

notifying the third party of the cart identification information and product information;

receiving the additional information from the third party;

associating the additional information with the cart identification information; and notifying the first user of the product information, designation information and additional information associated by the cart identification information.

According to this method, a user designates and shows to a third party the contents of his online shopping cart, and can have that third party supply the cart with additional information such as proposals and advertisements relating to the products in the cart. This allows the user to receive useful information, thereby allowing him to purchase good products at a more appropriate price. This also gives the third party a chance to advertise a product that the user has a high possibility of purchasing.

Predetermined product information includes not just the product, but the product vendor, product price, etc.

Additional information will differ according to the third party, and no particular restrictions are placed thereupon. Possible examples include advertisements, coupons, receipts, warranties, and manuals. Comments from a different user who purchased the same product may also be used as additional information.

It is preferable that the cart contents sent to a third party include not just the product but also additional information and designated third parties. There is no particular restriction on when the contents of a cart are sent to a third party. They can be sent, for example, when there are instructions from a designated third party, when there are changes in the cart contents, at predetermined times, etc. Similarly, there are no particular restrictions on when the owner of a cart is notified of additional information; possible times, for example, include when there are instructions from the owner of the cart and when there are instructions from a third party.

A second aspect of the present invention provides an online sales promotion method in accordance with the first-mentioned aspect. The method further comprises steps of:

associating settlement information of the user needed for a purchase of the product over the network with the cart identification information;

receiving an instruction for the purchase of the product from the first user; and selling the product to the first user, using the settlement information.

A third aspect of the present invention provides an online sales promotion method in accordance with the second-mentioned aspect. The method further comprises steps of:

storing whether or not the product is purchased; and notifying the first user that the product is purchased or not purchased yet.

Products not yet purchased and purchased products can be mixed together in a cart, but the cart contents are notified in a manner such that the two are distinguishable.

A fourth aspect of the present invention provides an online sales promotion method in accordance with the second-mentioned aspect.

The method further comprises steps of:

associating the first user with the cart identification information;

receiving an instruction for assignment and second user information on a second user from the first user; and associating the second user with the cart identification information.

Individual carts in which products are placed can be transferred to different users. For example, user A selects three end-of-year gifts and places them in a cart, completes the settlement, and transfers the cart to user B. Upon transfer, the ownership of the cart changes from user A to user B. However, it is preferable that user B not be able to change the products in the cart or change the upper limit of the settlement amount. It is also necessary for the settlement information in the cart to be shielded so that user B cannot see it. When user B selects a product and gives purchase instructions, the product is delivered to user B, and the cost for the product is paid by user A's credit card.

A fifth aspect of the present invention provides an online sales promotion method in accordance with the second-mentioned aspect. The method further comprises steps of:

determining whether or not an incentive condition has been fulfilled based on the product information, designation information and settlement information, the incentive condition predetermined for awarding the first user for the purchase of the product; and awarding the first user based on the determining.

For example, when a number of third parties equal to or above a predetermined number are designated, a set discount can be given to purchases in that cart.

A sixth aspect of the present invention provides an online sales promotion method in accordance with the first-mentioned aspect. The method further comprises a step of notifying the third party of the additional information.

A third party that provides products can learn what additional information other third parties are providing to a user, that is, when a company provides additional information, it can make comparisons with other additional information to decide what sort of advertising to make available to the user.

A seventh aspect of the present invention provides an online sales promotion method in accordance with the first-mentioned aspect. The method further comprises a step of notifying the third party of competitor information on other third parties.

A third party that provides products can learn what additional information competitors are providing to a user, that is, it can learn who its competitors are. As with the above sixth-mentioned aspect of the present invention, when a company provides additional information, it can make comparisons with other companies to decide what sort of advertising to make available to the user.

An eighth aspect of the present invention provides an online sales promotion method in accordance with the first-mentioned aspect. The method further comprises steps of:

monitoring for an occurrence of a predetermined event based on the product information and designation information; and notifying the third party of the occurrence when the predetermined event occurs.

For example, when designated third parties totaling 10 are reduced to three, those remaining three are notified to that effect. Those third parties, knowing that there is a high probability that their company's product will be bought, can take measures such as immediately sending out an advertisement.

A ninth aspect of the present invention provides an online sales promotion method in accordance with the first-mentioned aspect. The method further comprises steps of:

determining whether or not the third party has fulfilled a fee charging condition based on the product information and designation information, computing fee charging information for charging fees to the third party which has fulfilled the fee charging condition; and storing the fee charging information for invoicing the third party.

For example, the fees to be charged to a designated third party are decided beforehand for such cases as when a designated third party has supplied additional information such as advertisements to a cart, or has had a user make a purchase after the presentation of additional information. The fees charged may differ from third party to third party. Third parties that match certain conditions are extracted and the amounts to be invoiced are allowed to accumulate. At an appropriate time, based on the accumulated results, the third parties are invoiced, thereby allowing the party that supplied the cart to obtain revenue.

A tenth aspect of the present invention provides an online sales promotion method in accordance with the first-mentioned aspect. The method further comprises steps of:

computing a relationship between product and product price based on the product information; and supplying the relationship to the first user and/or the third party.

Statistics showing what kinds of products are being sold at what prices are taken from the product information and supplied to the user and third parties. The user sees the appropriate price for purchasing the product. The third parties, while considering the balance between competitors' prices and their prices and services, are able to sharpen their marketing strategies.

An eleventh aspect of the present invention provides an online sales promotion apparatus used in a system to purchase a product over a network. The apparatus comprises:

means for receiving product information on the product and designation information on a third party being able to supply additional information about the product from a first user;

means for associating the product information and designation information with cart identification information;

means for notifying the third party of the cart identification information and product information;

means for receiving the additional information from the third party;

means for associating the additional information with the cart identification information; and means for notifying the first user of the product information, designation information and additional information associated by the cart identification information.

A twelfth aspect of the present invention provides a computer-readable recording medium whereon is recorded an online sales promotion program, for use in a system to purchase a product over a network. The program executes:

(A) a step of receiving product information on the product and designation information on a third party being able to supply additional information about the product from a first user;

(B) a step of associating the product information and designation information with cart identification information;

(C) a step of notifying the third party of the cart identification information and product information;

(D) a step of receiving the additional information from the third party;

(E) a step of associating the additional information with the cart identification information; and (F) a step of notifying the first user of the product information, designation information and additional information associated by the cart identification information.

This has the same operational effect as the first-mentioned aspect of the present invention.

A thirteenth aspect of the present invention provides an online sales promotion method comprising steps of:

prompting a user to select a desired product and vendor from which the user intends to purchase the product;

notifying the vendor of the product selected;

receiving from the vendor advertisement information pertaining to the product and/or the vendor; and distributing the advertisement information to the user.

Under this method, the user's desired product is shown only to the vendor designated by the user, and that vendor supplies advertisements to the user.

EMBODIMENTS

In the present invention the term online shopping cart (hereinafter simply "cart") has a broader meaning than usual. Primarily, the cart does not need to have a purchase function. In other words, a cart that has only the function of temporarily holding goods that a user is undecided about buying will be called a cart. Second, a cart can store products that have already been purchased, and can have the function of distinguishing between purchased items and candidate items, and holding them.

OUTLINE OF THE INVENTION

In the online sales promotion system of the present invention, the user designates the businesses to which to show the cart contents. The designated businesses, based on the cart contents, supply external information (equivalent to additional information) to the cart thought to be useful to the user. By comparing external information supplied by a plurality of companies regarding a product in which he is interested, a user can select the product that most closely matches his wishes. Meanwhile, businesses can expect increased sales, because they can advertise for a product in which they know beforehand the user has interest. When supplying external information, a designated business can also view the advertisements that other designated businesses are supplying to the user. Therefore, the designated business is able to implement a more effective marketing strategy, such as making an advertisement that more clearly shows the difference between its product and the products of its competitors.

BRIEF DESCRIPTION OF THE DRAWINGS

FIG. 4A is a conceptual view of the cart database shown in FIG. 2.

FIG. 4B is a conceptual view of a store database shown in FIG. 2.

FIG. 5A is a conceptual view of an item database shown in FIG. 2.

FIG. 5B is a conceptual view of a fee-charging database shown in FIG. 2.

FIG. 6 is a conceptual view of settlement information list shown in FIG. 3.

FIG. 7 is a conceptual view of a permission list shown in FIG. 3.

FIG. 8A and FIG. 8B are conceptual views of a candidate product list shown in FIG. 3.

FIG. 9 is a conceptual view of purchased product list shown in FIG. 3.

FIG. 10 is a conceptual view of external information list shown FIG. 3.

FIG. 11A and FIG. 11B are conceptual figures of a fee-charging information list shown in FIG. 3.

FIG. 12 is a view of a list showing an example of cart contents sent to businesses in accordance with a first embodiment of the present invention.

FIG. 21A is a view of a computer screen in which the schedule for a day includes cart contents showing a request input example in accordance with a first embodiment of the present invention.

FIG. 21B is a view of a computer screen in which the schedule for a day includes cart contents of FIG. 21A showing a proposal display example in accordance with a first embodiment of the present invention.

FIG. 22 is a view of FIG. 21 B after a schedule has been decided.

FIG. 24 is a view analysis results of cart contents in accordance with a first embodiment of the present invention.

DETAILED DESCRIPTION OF THE PREFERRED EMBODIMENTS

First Embodiment

A preferred embodiment of the online sales promotion system of the present invention will now be explained in detail.

Overall Constitution

Figure 1:
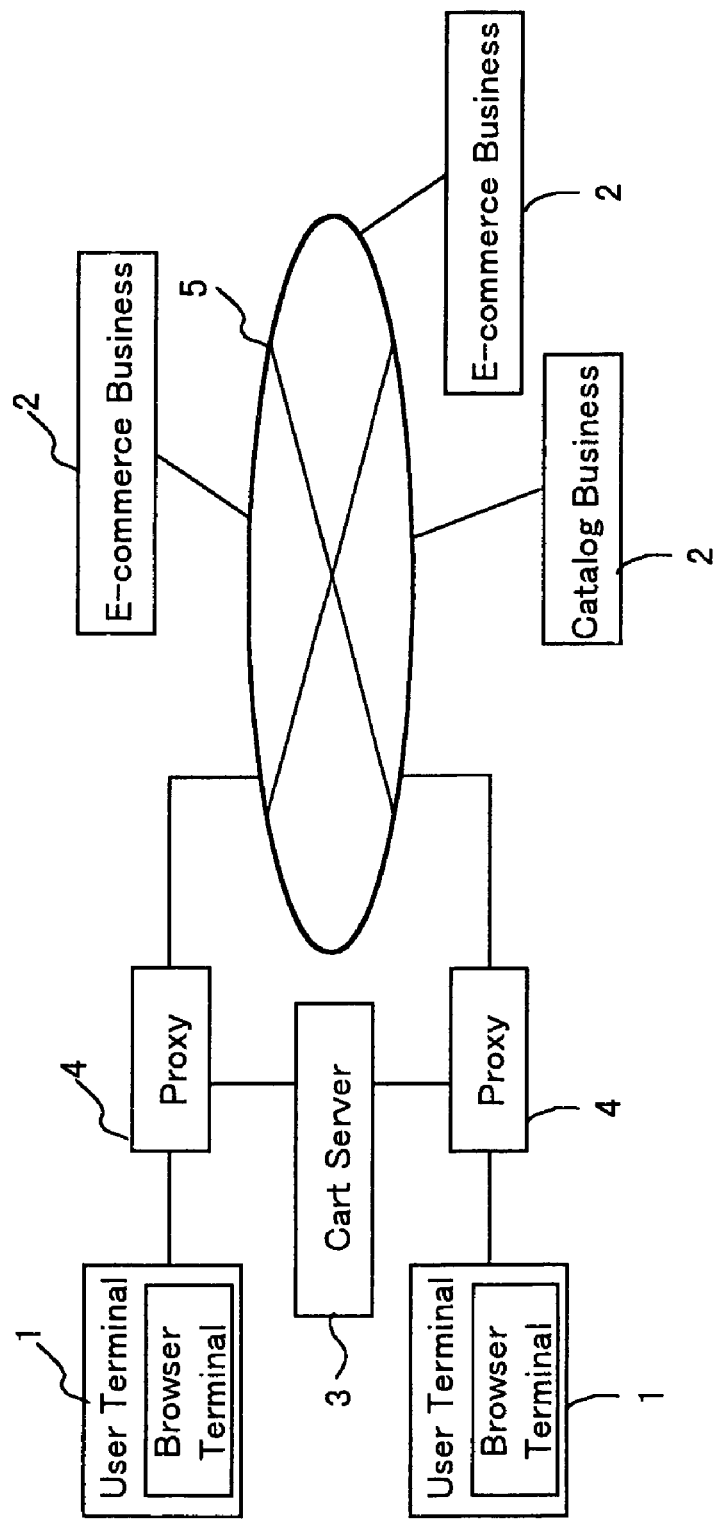
FIG. 1 is an overall block diagrammatical view of an online sale promotion system in accordance with a first embodiment of the present invention.

FIG. 1 shows an overall block diagram of an online sales promotion system according to a first embodiment of the present invention. This system includes a user terminal 1, an e-commerce business and catalog business 2, a cart server 3, and a proxy 4 being interconnected by the Internet 5. The e-commerce business 2 and catalog business 2 (hereinafter "business") sell products on web sites on the Internet 5, and are affiliated with the supplier of the cart server 3 (hereinafter "cart business"). The cart server 3 provides carts to users. By drag-and-dropping an icon for a product displayed on a business web site, a user can place that product in his own cart.

The user terminal 1 is connected to the Internet 5 via the proxy 4. It displays web pages using a browser. The cart server 3 is connected to the back end of this proxy 4. When the user terminal 1 accesses the web site of the business 2, the proxy 4 rewrites the access information so that the cart contents and the web page are displayed by the browser.

Function and Constitution of Cart Server and Proxy (1) Overall Constitution

Figure 2:
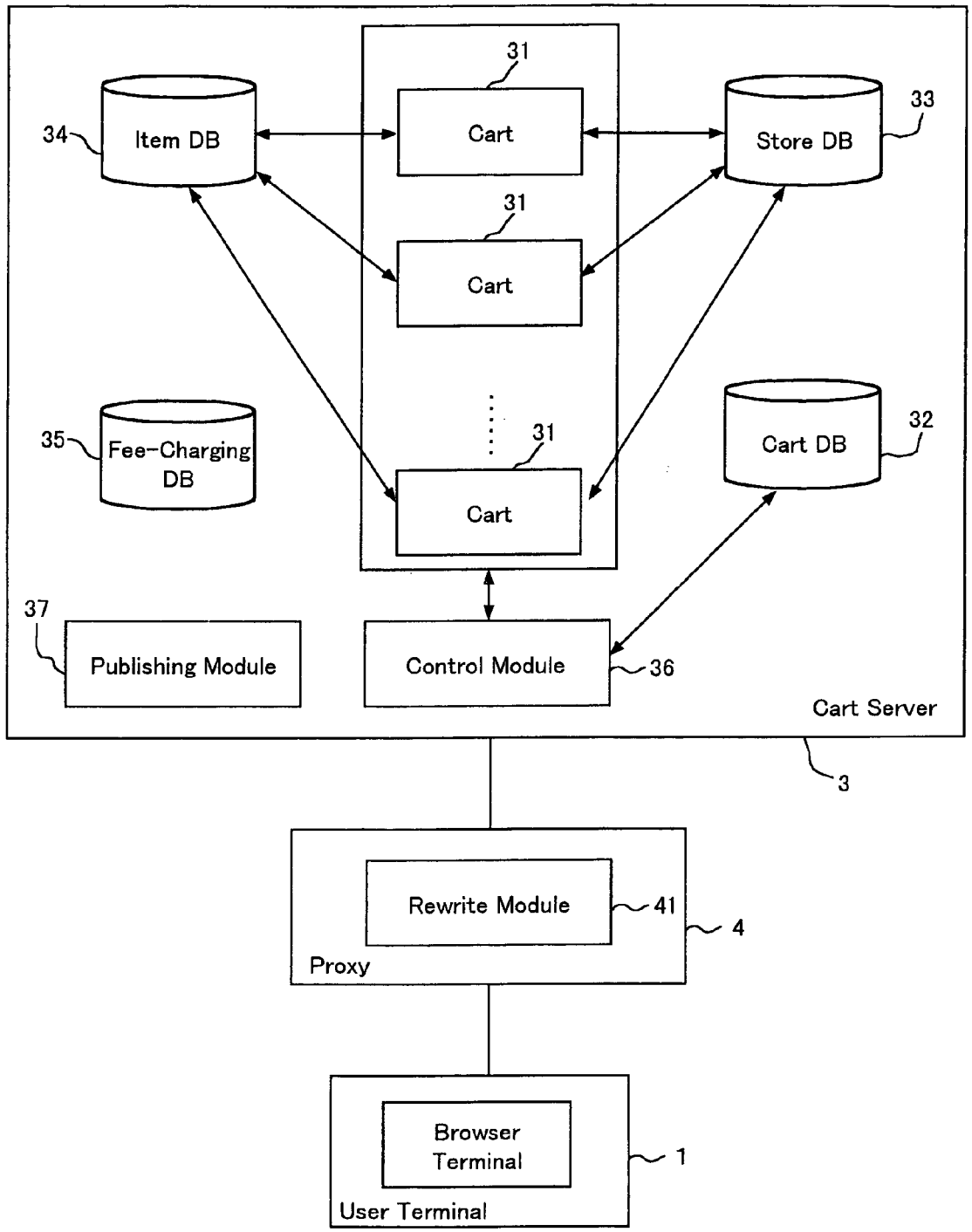
FIG. 2 is a block diagrammatical view showing functions of a cart server and proxy shown in FIG. 1.
Figure 3:
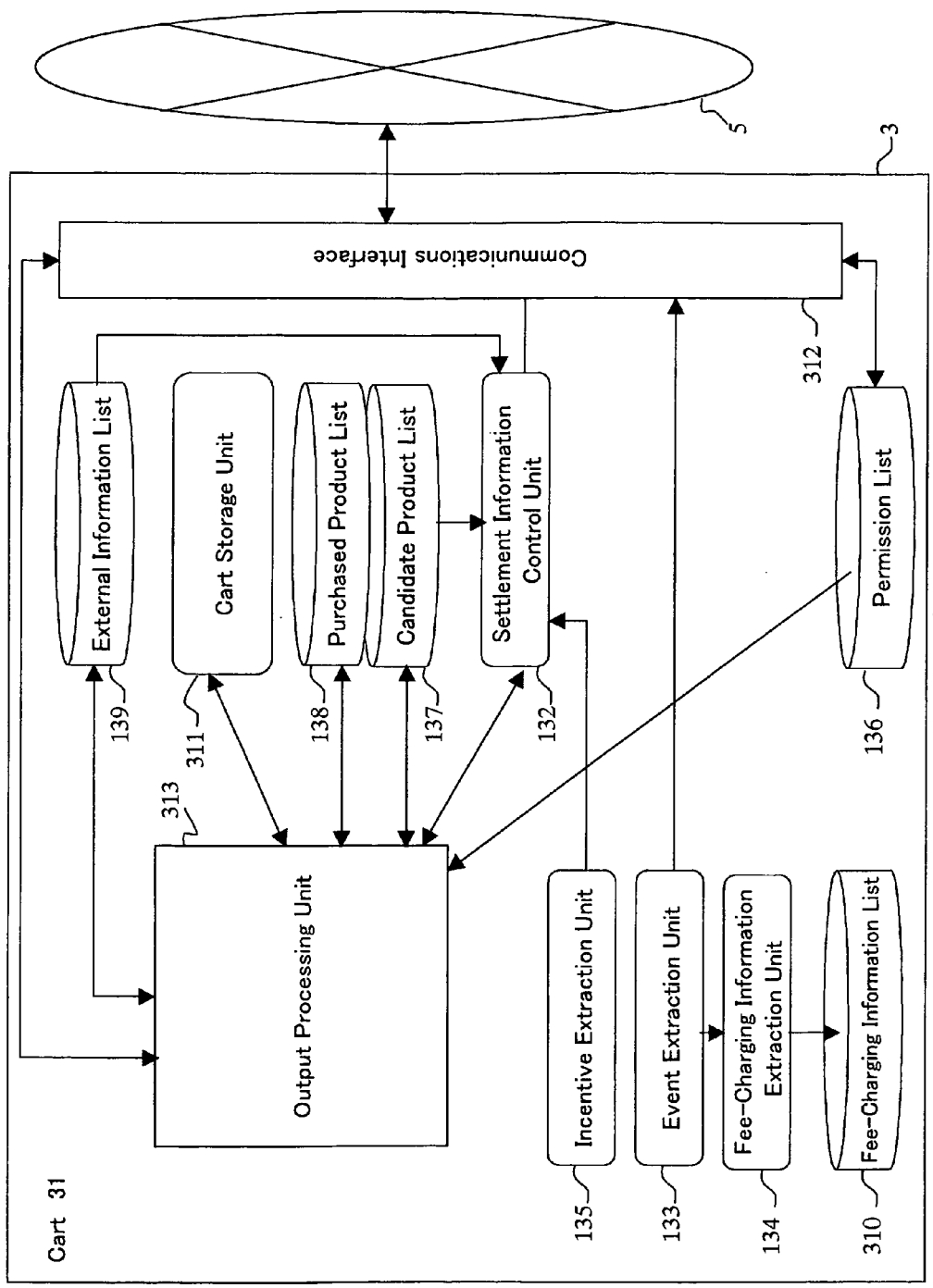
FIG. 3 is a block diagrammatical view showing detailed functions of part of the cart server shown in FIG. 1.

FIG. 2 is a block diagram showing the constitution and function of the cart server 3 and the proxy 4. FIG. 3 is a block diagram showing in detail the functions of part of the cart server 3. As shown in the drawings, the cart server 3 has a plurality of carts 31. The cart server 3 also stores data needed for operating carts 31 in a cart database 32, a store database 33, an item database 34 and a fee-charging database 35.

In addition to the above databases, the cart server 3 has a control module 36 and a publishing module 37. The control module 36 identifies a user cart that accesses a web site, and instructs that cart to supply content to the user terminal 1. The publishing module 37 analyzes the contents of each cart and supplies the results to the user, businesses and the like.

Each cart 31 stores predetermined information, and furthermore has an output processing unit 313, a settlement information control unit 132, an event extraction unit 133, a fee-charging information extraction unit 134, an incentive extraction unit 135 and a communications interface 312 as seen in FIG. 3. The information stored in carts will be discussed below.

The output processing unit 313 converts the contents of a cart into an HTML file for display on the browser and into an XML file to send to the business 2. The output processing unit 313 also rewrites the cart contents based on instructions from the user. The output processing unit 313 also receives external information from the business 2 and holds this in the cart.

The settlement information control unit 132 stores settlement information, which will be discussed below, and based on this information performs settlement processing. The event extraction unit 133 and the fee-charging information extraction unit 134 charge fees to the business 2 that has fulfilled predetermined conditions. The incentive extraction unit 135 awards bonuses to users who have fulfilled predetermined conditions. The communications interface 312 sends and receives data between the cart and the business 2, and between the cart and the proxy 4.

As seen in FIG. 2, in addition to the standard functions, the proxy 4 is provided with a rewrite module 41. The rewrite module 41 processes data so that the contents of the user's cart and the accessed web site are both displayed on the browser. The proxy 4 is different from the so-called web proxy, that is, the proxy provided on firewalls for the purpose of preventing external web access; rather, it is a proxy provided for the working of the present invention.

(2) Information Stored in the Cart Server (2-1) Cart Database

Each cart in the cart server 3 has an identification number (hereinafter "cart ID"), managed by the settlement information control unit 132. FIG. 4A shows a conceptual drawing of the information stored in the cart database 32. In the cart database 32, the cart ID and the cart owner are correlated and stored. In this FIG. 4A, email addresses are used as the information for identifying cart owners. Other information that can be used includes the user identification information unique to this system.

(2-2) Store Database

FIG. 4B is a conceptual drawing showing the information stored in the store database 33. Stored in the store database 33 are the names of the E-commerce businesses and catalog businesses that have contracted with the cart business ("name" tag in the figure), the identification number of each business 2 (hereinafter "store ID") ("store sid" tag in the figure), the address of the icon representing each business 2 ("icon" tag in the figure), and the communication address of each business 2 ("address" tag in the figure). As will be discussed later, this communication address is used to determine the address to which to send the contents of a cart. For example, in FIG. 4B, the business specified by the store ID "0123" is Akachanya, and the communication address for Akachanya is http://Akachan-ya.com.

(2-3) Item Database

FIG. 5A is a conceptual drawing showing the information stored in the item database 34. Stored in the item database 34 is a list of the products that can be placed in a cart. Specifically, for each product, the identification number ("item id" tag in the figure, hereinafter "item ID"), product name ("name" tag in the figure), and the address of the icon representing the product ("icon" tag in the figure) are listed. A user can place products in the item database 34 in his cart. Each business 2 correlates its products with an item ID beforehand.

(2-4) Fee-charging Database

FIG. 5B is a conceptual drawing showing the information stored in the fee-charging database 35. Stored in the fee-charging database 35 are the store ID, cart ID, fee amount, date, and bank account to be debited. For example, accumulated fees are calculated each month for each business 2, and the corresponding amount is debited from a bank account of each business 2.

(3) Information Stored in Each Cart

FIGS. 6 through 11 will be used to explain the information stored in each cart.

(3-1) Settlement Information List

FIG. 6 is a conceptual drawing showing the information stored in a settlement information list. The settlement information list is stored in the settlement information control unit 132 of a cart, as shown in FIG. 3. Stored in the settlement information list is information relating to the credit card of the cart owner. In this example, credit ID ("credit ID" tag in the figure) in the form of consecutive numbers and such, credit card member number ("number" tag in the figure), user name ("holder" tag in the figure), expiration date ("valid through" tag in the figure) and credit card type ("description" tag in the figure) are listed. In this figure, the user Taro Fuji has two types of credit cards, a MasterCard and a JCB card.

(3-2) Permission List

FIG. 7 is a conceptual drawing showing the information stored in the permission list 136, shown in FIG. 3. The permission list 136 lists the businesses (hereinafter "designated businesses") that the owner of the cart has permitted to see the contents of his cart. Specifically, the store ID ("Store sid" tag in the figure) and the addresses to which the contents of the cart are to be sent ("address" tag in the figure) are listed. In this figure, "Akachanya," "Ningyo-no Satsukido" and "Gift Honpo" are listed as businesses in the permission list 136.

(3-3) Candidate Product List

FIGS. 8A and 8B are conceptual drawings showing the information stored in the candidate product list 137 seen in FIG. 3. This list includes the item ID ("item id" tag in the figure) of products which the user is unsure about whether to purchase or intends to purchase, price, if available ("price" tag in figure), business name ("store" tag in the figure), and product name. In FIG. 8A "giant bear" and "12,000 yen" are listed on the candidate product list 137. In FIG. 8B, "giant bear," "10,000 yen" and "Kuma Honpo" are listed on the candidate product list 137.

When a product icon from an E-commerce business web site has been drag-and-dropped into a cart, the price listed on the web site and the business name on the web site appear on this list. However, when a product has been selected from the web site of a catalog business, the price and business name are not definite at this point and thus, they do not appear on this list. This allows businesses that have been notified of the candidate product list to learn which business ' product the user has selected. A business can therefore provide the user with different advertisements, depending upon whether the user has selected its product or the product of a competitor.

(3-4) Settled List

FIG. 9 is a conceptual drawing of the information stored in the purchased product list 138, shown in FIG. 3. This list includes, for the products placed in a cart, the item ID of purchased products ("item" tag in the figure), the purchase price ("price" tag in the figure) and the business name ("store sid" tag in the figure). FIG. 9 shows both the candidate product list 137 and the purchased product list 138. The purchased product list 138 states that a doll with item ID "5235" was purchased at the business "Sanjusando" for a price of "18,000 yen." When a user gives instructions to select and purchase any product on the candidate product list 137, that product is moved from the candidate product list 137 to the purchased product list 138.

(3-5) External Information List

FIG. 10 is a conceptual drawing showing the information stored in the external information list 139, shown in FIG. 3. Stored in this list is information provided by designated businesses relating to products in a cart. Specifically, this list stores the identification number of the external information (hereinafter "ad ID," "ad aid" tag in the figure), store ID and business name ("store" tag in the figure) and item ID and product name ("item" tag in the figure) and the contents of the external information (equivalent to additional information, "ad_body" tag in the figure).

In this example, the ad ID "222123" shows that an advertisement "20% off sale now going on at Ningyo-no Satsukido" is being provided by "Ningyo-no Satsukido" with store ID "0564" regarding the "dolls (2)" with item ID "5235."

(3-6) Fee-charging Information List

FIGS. 11A and 11B are conceptual drawings showing the information stored in the fee-charging information list 310, shown in FIG. 3. In order to collect service fees corresponding to advertising fees from a designated business, the fees charged to each business are stored beforehand on this list. Specifically, the fee-charging information list 310 stores business name, fee amount, and fee payer information. Fee payer information is, for example, the number of the bank account to be debited. FIGS. 11A and 11B show that different fees have been established for each business.

(3-7) Cart Storage Unit

The cart storage unit 311 in FIG. 3 stores cart name, category list, cart category and gift flag. The user chooses the cart name that he wishes. The category storage unit 311 stores the pre-prepared category list (not shown), and stores the designated category as the cart category. The gift flag is for indicating whether the cart is locked or not. If the cart is locked, the cart storage unit 311 also includes predetermined lock contents.

(4) Information Transmitted to Businesses

When a predetermined transmission event occurs, such as a change to the permission list 136 or a change to the products in a cart, the cart contents are sent to the designated businesses. FIG. 12 is a conceptual diagram showing the contents of a cart sent to a business. As the figure shows, the above information is compiled in XML format and the cart contents are converted into an XML file. This file contains the following information:

Cart ID ("cart id" tag in the figure)
   Cart name ("name" tag in the figure)
   Cart category ("category" tag in the figure)
   candidate product list ("wish list" tag in the figure)
   Settled list ("settled_list" tag in the figure)
   External information list ("ad_list" tag in the figure)
   Permission list ("permission_list" tag in the figure) and
   The presentation address ("address href" tag in the figure) that a business uses when presenting external information to a cart.

The generated XML files are transmitted to the respective transmission addresses listed on the permission list. It should be noted that adjustments can be made to the items to be delivered to each business. For example, all the items shown in FIG. 12 may be delivered to one business, but to another business, the permission_list tag portion, for example, may be excluded; in other words, a working form of the present invention is possible such that the permission list is not delivered.

Processing Flow

The flow of processing performed by this online sales promotion system will be explained in detail while referring to the figures.

(1) Processing of the Overall System

Figure 13A:
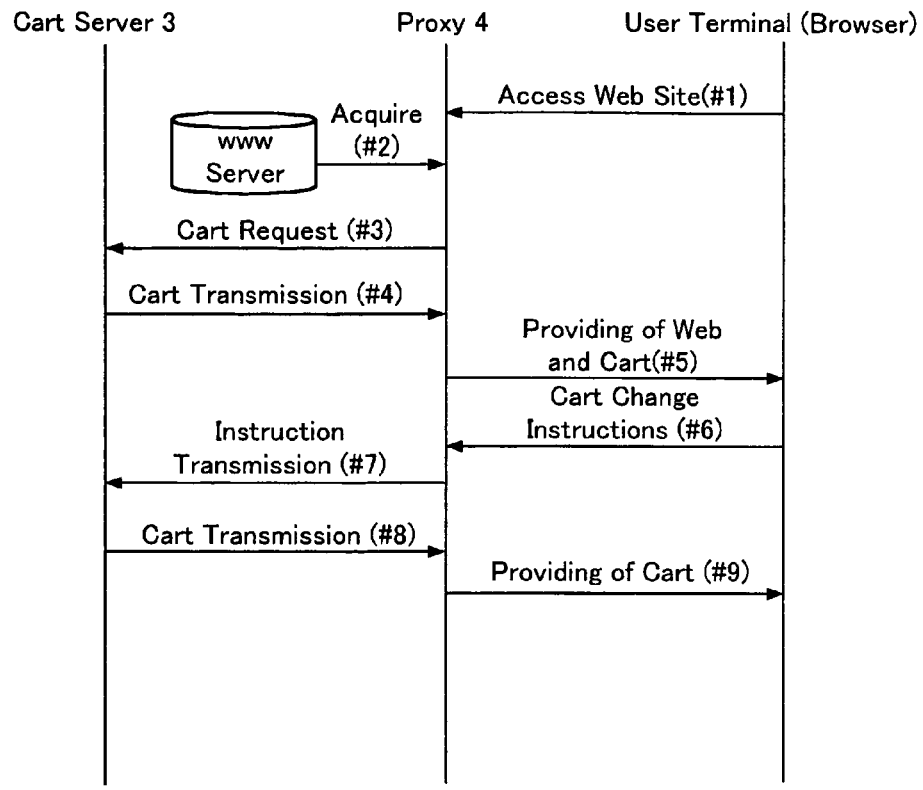
FIG. 13A is a conceptual view illust rating the cart display processing in accordance with a first embodiment of the present invention.
Figure 13B:
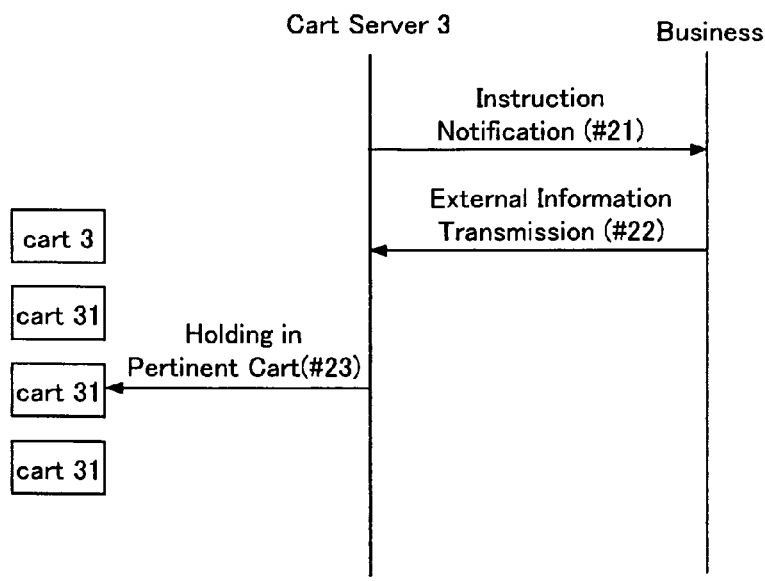
FIG. 13B is a conceptual view illustrating external information reception processing in accordance with a first embodiment of the present invention.

FIGS. 13A and 13B broadly show the flow of the overall online sales promotion system. FIG. 13A shows the cart display processing, and FIG. 13B shows the reception of external information processing flow.

An explanation will first be given of the cart display processing shown FIG. 13A. In this example, when a browser on the user terminal 1 accesses a web site, the user cart as well as the web site are displayed. When the user indicates a URL and requests access (#1), the proxy 4 obtains information of the designated web site from a WWW server (#2).

Next, the proxy 4 requests the cart owned by the user from the cart server 3 (#3) and acquires the cart (#4). The proxy 4 supplies the browser with the web site information and the cart contents (#5).

When changes are made to the cart contents (#6), those changes are sent from the proxy 4 to the cart server 3 (#7), and the cart contents are rewritten. Then, the new cart contents are supplied to the user terminal 1 via the proxy 4 (#8; #9), thereby updating the cart display on the user terminal 1.

Next, the reception processing of external information will be explained (FIG. 13B). At a predetermined timing, notification of the cart contents is given to a designated business (#21). This may occur, for example, when the permission list 136 is updated or the candidate product list 137 is changed. The designated business provides external information such as advertisements to the cart regarding which notification was given (#22). The provided external information is held in the cart, notification of the contents of which has been made to the designated business (#23).

(2) The Flow of Processing Performed by the Cart Server

Next the flow of processing performed by the cart server 3 will be explained, using a specific example.

(2-1) The Main Processing of the Cart Server

Figure 14:
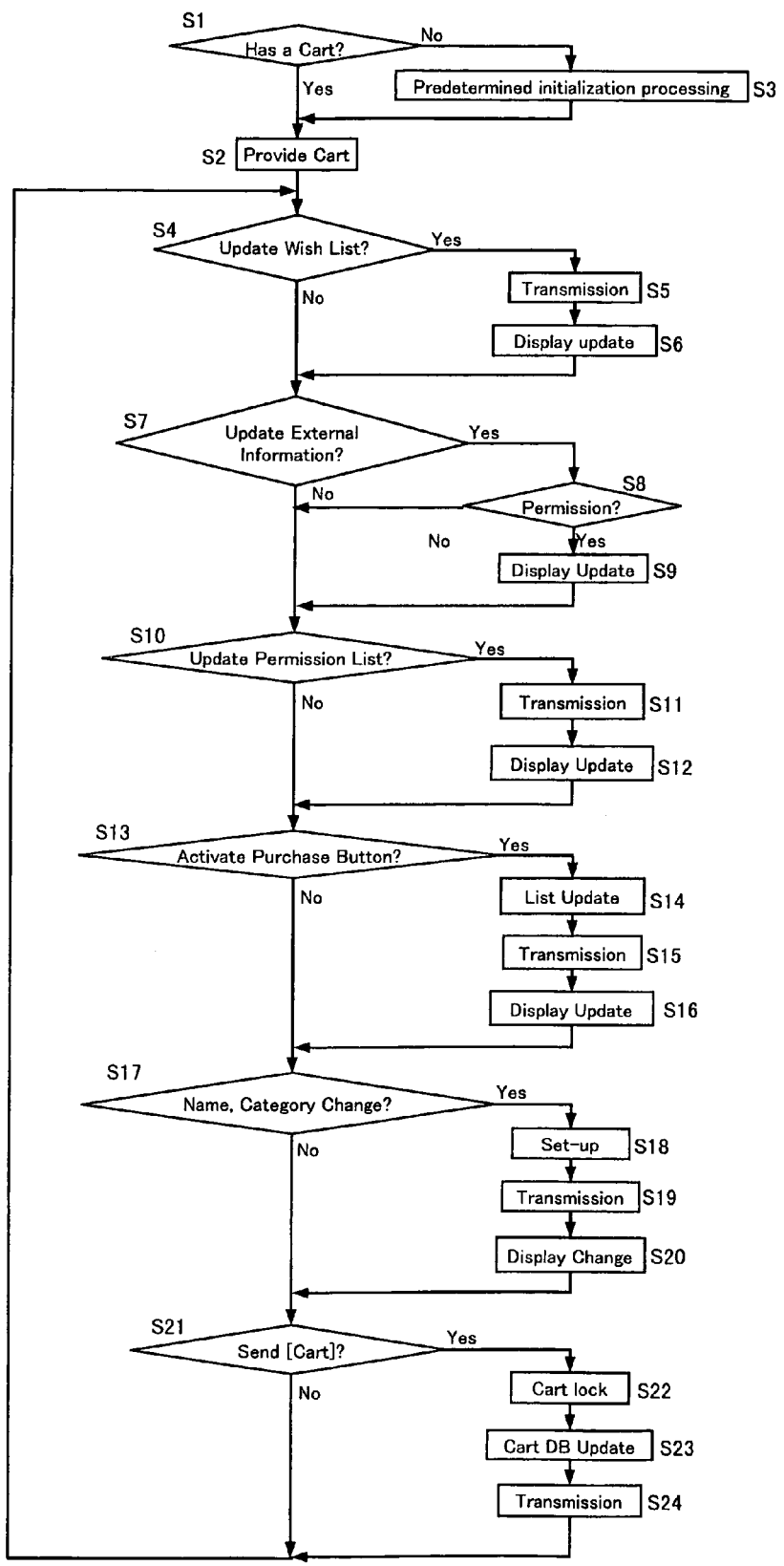
FIG. 14 is a view of a flow chart showing one example of the main processing performed by the cart server in accordance with a first embodiment of the present invention.

FIG. 14 shows a flow chart outlining the main processing performed by the cart server 3 having the functions described above. In the main processing, the cart server 3 performs the presentation of cart contents, changes thereto and notification thereof to designated businesses, as well as the receipt of external information.

Steps S1, S2: The cart server 3 determines whether or not there is a cart 31 for a user attempting to access a web site (S1); if there is, the existing cart contents are provided to the user terminal 1 (S2). If that user has a plurality of carts, all the carts may be provided, or only the cart of accessed businesses that are designated businesses may be provided.

There is no need to provide a cart each time a user accesses a web site. For example, it is fine to provide a cart only when a user accesses the web site of a predetermined business registered in the store database 33. In such a case, the cart server 3 determines whether or not the accessed site is the site of said predetermined business.

Step S3: If a user does not have a cart, the control module 36 of the cart server 3 performs predetermined initialization processing to create a new cart. For example, the control module initializes predetermined storage regions such as the permission list 136, the candidate product list 137, the purchased product list 138 and the external information list 139. It also gives the cart a cart ID and updates the cart database. Then it provides an empty cart to the user terminal 1. An empty cart is displayed at the user terminal 1. It should be noted that there is no need to always create a new cart when a user does not have a cart. For example, it is fine to provide a new cart only when a user accesses the web site of a predetermined business registered on the store database 33.

Steps S4, S5, S6: When a user changes the products on the candidate product list 137 (S4), the output processing unit 313 updates the candidate product list 137 and transmits the new cart contents to designated businesses (S5). This happens, for example, when a user adds new product to the candidate products, or when he purchases a candidate product, or when he deletes a candidate product. The output processing unit 313 of each cart monitors for changes of cart contents, and when the candidate product list 137 is updated, transmits an XML document (an example is shown in FIG. 12) describing the new cart contents to designated businesses. This is sent to the transmission address of each designated business listed on the permission list 136. The transmitted contents are stored in a memory device or the like that each business manages for itself. The output processing unit 313 also provides the new cart contents to the user terminal 1 via the proxy 4 when the candidate product list 137 is updated (S6). This causes the browser to display the new cart contents.

It should be noted that while the cart contents to be sent to designated businesses are not necessarily restricted to XML format, an example is shown here in an XML format, which makes it easy for designated businesses to process and use the cart contents. A cart business and businesses registered in the store database need to reach an agreement beforehand regarding the tags of the XML to be transmitted and received and the contents of the data contained in each tag. A designated business looks at the cart contents that have been transmitted, creates external information such as advertising, and sends this to the cart server. This created external information may be standard advertising prepared for a product, or it may be advertising customized for each user. For example, when its own product has been selected a business may send a thank you message, and when a competitor's product has been selected a business may send advertising emphasizing the superiority of its own product.

Steps S7, S8, S9: When external information such as an advertisement is sent from a business (S7), the output processing unit 313 of the cart to which that information was transmitted receives the external information via the communications interface 312. Next, the output processing unit 313 determines whether to hold the external information. The business is to send along with the external information, information identifying the business, such as store ID and cart ID. The output processing unit 313 can use the cart ID and store ID to determine whether the business is a designated business for that cart. If it is a designated business (S8), the output processing unit 313 holds that external information in the external information list 139 and updates the display of the cart contents (S9). While this is not shown in the figure, the new external information can be sent to designated businesses.

Steps S10, S11, S12: If the user adds a designated business to the permission list 136, or deletes one therefrom (S10), the output processing unit 313 updates the permission list 136. Pursuant to this, the output processing unit 313 sends the cart contents to the designated businesses (S11), and supplies the new cart contents to the user (S12). If a designated business is deleted from the permission list 136 (S10), the deleted business is notified that it has been deleted from the permission list 136. The former designated business, having received this notification, performs such processing as deleting that cart from the list of parties to which external information is provided, which the business itself administers.

If a new business is added to the permission list 136, a transmission address for sending cart contents to that business must be written to the permission list 136. This address may be automatically generated by the cart based on a predetermined method, or it may be received from the business. In either case, the method of giving the transmission address must be determined beforehand by the business and the cart business. This is because the transmission address is an address for identifying a storage region that the business administers itself.

Steps S13, S14, S15, S16: When a user selects any of the candidate products and gives instruction for purchase (S13), the output processing unit 313 updates the candidate product list 137 and the purchased product list 138 (S14), and sends the new cart contents to designated businesses (S15). The output processing unit 313 also provides the user with the new cart contents (S16). The settlement information control unit 132 receives instructions from the user about which credit card to use in the settlement, and performs settlement processing according to instructions. By including the purchased product list 138 in the cart contents and sending the list 38 to designated businesses, designated businesses can avoid sending unnecessary advertisements concerning a purchased product, and can turn its marketing strategy, for example, toward advertising related products that the user might be interested in purchasing.

Steps S17, S18, S19, S20: When a user changes a cart name or category (S17), the output processing unit 313 establishes the cart name and category in the cart storage unit 311 (S18). Next, the new cart contents are sent to a designated business (S19) and the new contents are provided to the user (S20).

Steps S21, S22, S23, S24: When a user "Taro" designates another user, for example, "Jiro," and makes a gift of a cart, that cart is locked. Specifically, for example, this means that the prospective products to be purchased in the cart cannot be changed, that an upper limit purchase amount is established, and that the number of articles that can be purchased is set. Furthermore, the settlement information established by the previous owner of the cart, "Taro," is fixed, and the new owner, "Jiro," cannot see this information.

In order to make possible the determination of whether or not a cart is locked, the gift flag region of each cart storage unit 311 is used. If the gift flag is on, that cart is deemed to be locked, and the output processing unit 313 will not accept any changes to predetermined information.

After this, the control module 36 of the cart server 3 converts the user name in the cart database 32 to the designated other user name (S23), and the new cart contents are sent to designated businesses (S24). When the user "Jiro" to whom the cart has been given designates and purchases a product, the settlement is carried out using the credit card of "Taro," the party that sent the gift.

As long as the cart is displayed, the cart server 3 will repeat the processing of the above steps S4 through S24, updating the cart contents, sending the same to designated businesses, and updating the display.

In the processing shown in FIG. 14, the cart contents are sent to designated businesses when there has been a change to the cart contents; however, this may be done at other times as well. For example, this can be done at a predetermined interval, when there have been instructions from a designated business, or when there have been instructions from the user.

(2-2) Additional Processing of the Cart Server

In addition to the main processing described above, it is preferable that the cart server 3 perform the processing below.

(2-2-1) Processing by the Event Extraction Unit

The event extraction unit 133 extracts predetermined events from the cart and notifies designated businesses thereof. For example, when the number of candidate products reaches or falls below a predetermined number, or when the number of designated businesses reaches or falls below a certain number, the designated businesses are notified. In these cases, because it is anticipated that the user has a clearer idea of what he wants to purchase and that the time of purchase is nearing, this is valuable information for the designated businesses.

(2-2-2) Processing by the Fee-Charging Information Extraction Unit

The fee-charging information extraction unit 134 extracts events for which designated businesses should be charged a fee, and updates the fee-charging database 35. Examples of these events include when a designated business has provided external information to a cart, when external information has been provided to a user, when a candidate product has been purchased from a designated business. When these predetermined events occur, the fee-charging information extraction unit 134 refers to the fee-charging information list 310, determines the amount to be charged and writes the charge amount in the entry for the pertinent businesses in the fee-charging database 35. The fees are stored for each business in the fee-charging database 35, and, for example, every month, the accumulated amounts are calculated and the resulting amount is debited from each business's bank account designated for debiting.

(2-2-3) Processing by the Incentive Extractive Unit

The incentive extraction unit 135 extracts events for which a user should be awarded bonuses, and awards incentives such as discounts on purchases and presents to users. Examples of such events include when a designated business is newly added to the permission list 136, when the number of designated businesses reaches or exceeds a predetermined number, when a product is purchased from a designated business. When such events occur, the incentive extraction unit 135 awards predetermined incentives to the user. In this embodiment, the incentive condition is that when a product is purchased from a business on the permission list 136, a predetermined discount is given on the purchase of the product. This is to encourage the addition of businesses to the permission list 136.

(2-2-4) Analysis Processing by the Publishing Module

The cart server 3 can use the publishing module 37 to analyze the contents of a cart, and provide the analysis results to the user and businesses. For example, information on the range of actual prices at which products have sold, the most common price, the highest price, the lowest price, and the ranks of businesses that have sold that product can be provided. The potential analysis is not limited to this; to meet the needs of users and businesses, a wide variety of information can be analyzed, and the results of that analysis can be provided.

The analysis results can, for example, be used by a user to determine whether or not the price proposed by a designated business is appropriate or not. Additionally, a business will be able to obtain such information as the price at which competitors are selling a product, the price at which a product is actually selling, what the popular products are, etc.

(3) Processing Performed by the Proxy

Next, an explanation will be given of the processing performed by the proxy 4, referring again to FIG. 13A. In order to simplify the explanation, an example will be used in which the processing displays a cart when a browser on the user terminal 1 has accessed a web site, and the web site and cart are displayed in separate windows.

The proxy 4, when the user has accessed a web site (#1), acquires web site information from the WWW server (#2) and acquires the user's cart from the cart server 3 (#3, #4).

Next, the proxy 4 processes the data so that both the acquired cart contents and the accessed web site are displayed simultaneously by the browser. Specifically, the proxy 4 sends multi-framed data to the browser so that the web site and cart are displayed in separate frames (#5).

As shown, for example, in FIG. 20, a web site 201 and cart contents 202 are displayed by the user's browser in multiple frames.

Screen Examples

Next, the functions of the online sales promotion system relating to this embodiment will be explained using screen examples.

Figure 15B:
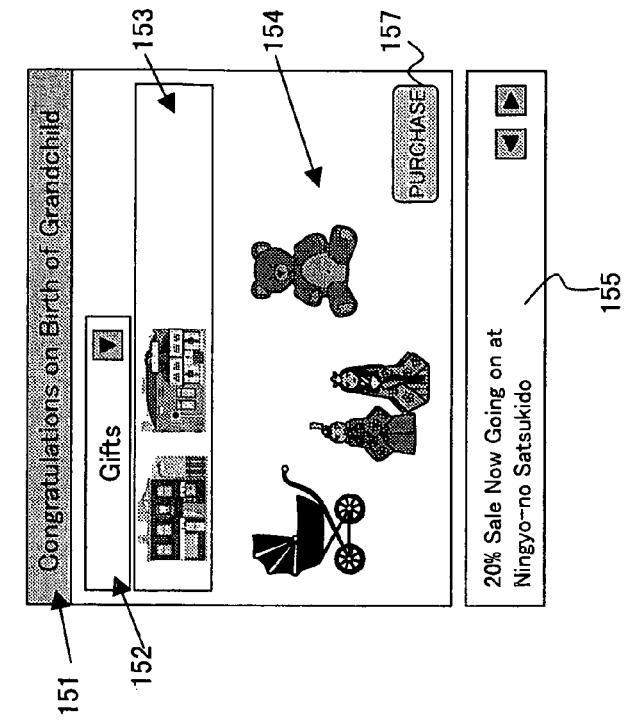
FIG. 15B is a view of a computer screen displaying cart content by icons in accordance with a first embodiment of the present invention.
Figure 15A:
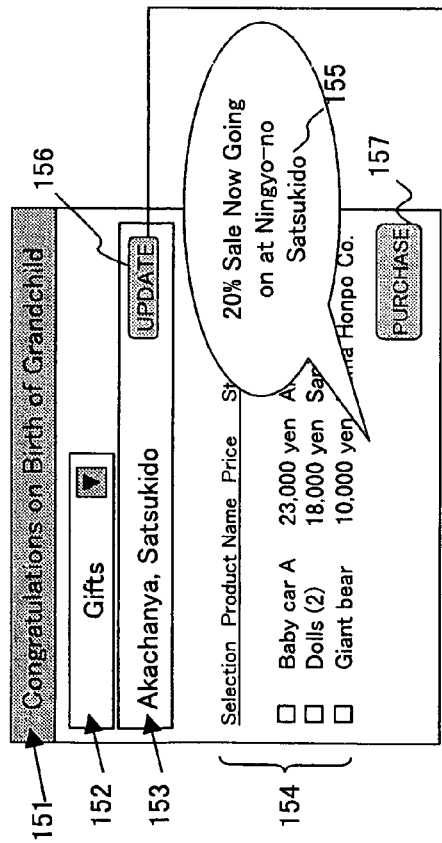
FIG. 15A is a view of a computer screen displaying cart content by text in accordance with a first embodiment of the present invention.

FIGS. 15A and 15B are examples of displays of cart contents. A cart name 151, a cart category 152, a permission list display 153, a candidate product list display 154 and an external information list display 155 are shown. In FIG. 15A, the permission list display 153 and the candidate product list display 154 are displayed as text. The price displayed on the candidate product list display 154 is the price displayed on the web site of the e-commerce business or the catalog business. For example, the "giant bear, 10,000 yen, Kuma Honpo" on the candidate product list display 154 is the result of the user drag-and-dropping the 10,000 yen giant bear displayed on the Kuma Honpo web site into a cart.

In FIG. 15A, the advertising that is external information is displayed in a balloon 155 for each product on the candidate product list 137. This balloon 155, for example, is displayed when the cursor is placed over a product displayed on the screen. Also, the "update button" 156 of the permission list 136 and the "purchase button" 157 for candidate products are displayed. When a user activates the update button 156, the update window, shown in FIG. 15C of the permission list 136 is displayed, and the permission list 136 can be updated. When the user selects a candidate product and activates the purchase button 157, the settlement for the selected product is performed.

In FIG. 15B, the permission list display 153 and the candidate product list display 154 are displayed as icons. The external information list display 155 is displayed below the candidate product list 137 in a separate window.

Figure 15C:
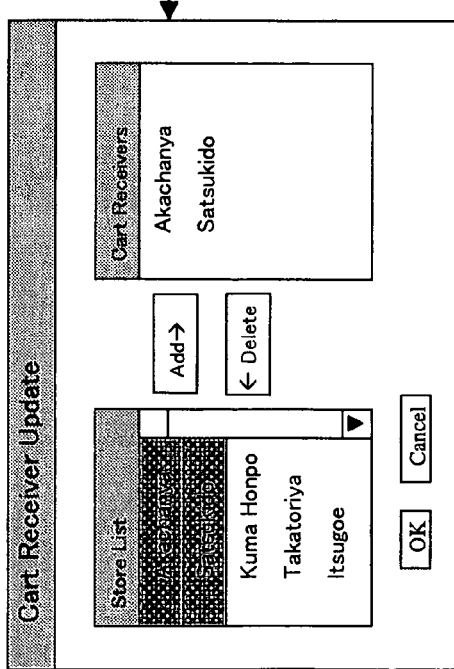
FIG. 15C is a view of a computer screen showing an update screen of the permission list in accordance with a first embodiment of the present invention.

In the permission list 136 update window shown in FIG. 15C, stores registered in the store database 33 are displayed in the "store list." By designating any business from the "store list" and activating the "add button," a user registers that business as a "cart recipient" (i.e., on the permission list 136). Also, by designating any business from the "cart recipient" list and activating the "delete button," a user can remove a business from the permission list 136.

Figure 16A:
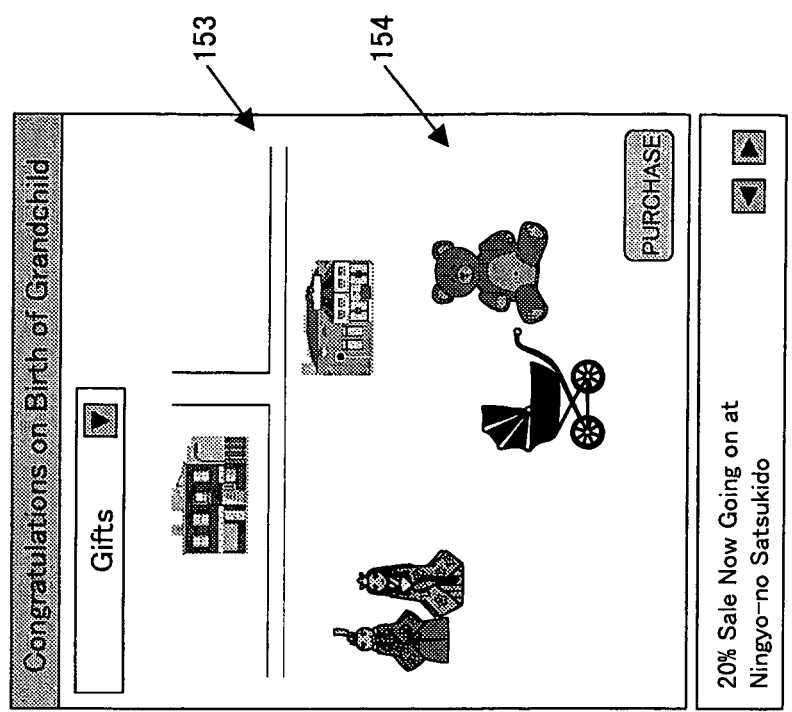
FIG. 16A is a view of a computer screen showing the permission list in the form of a map in accordance with a first embodiment of the present invention.
Figure 16B:
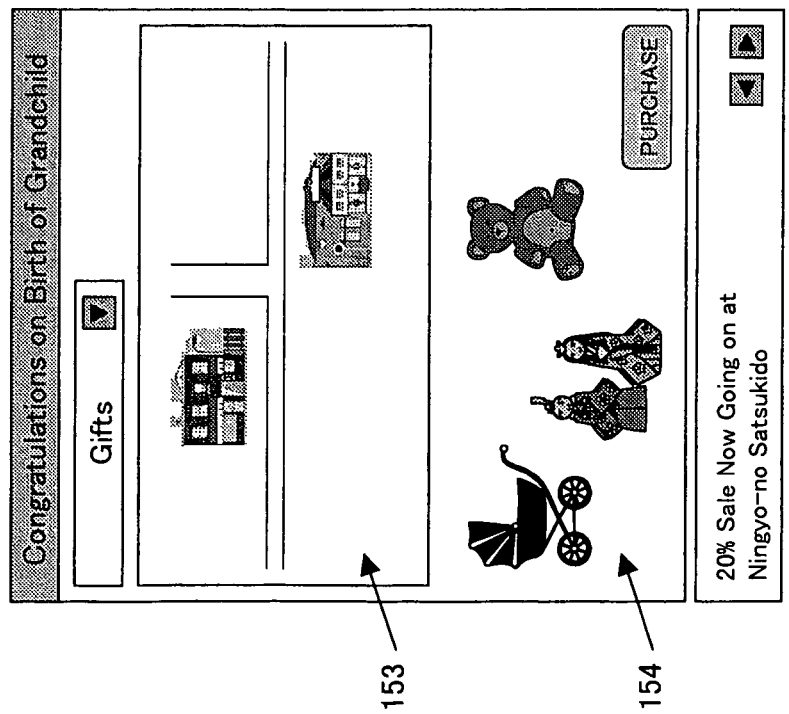
FIG. 16B is a view of a computer screen showing the permission list and the candidate product list are shown mixed together in accordance with a first embodiment of the present invention.

FIGS. 16A and 16B are different examples of the display of cart contents. In FIG. 16A, both the permission list display 153 and the candidate product list display 154 are displayed as icons, and furthermore, the permission list display 153 is displayed in the form of a map. When the map displays the actual location of a store, it is easy for a user to understand where a business is actually located. Even when the map displays a virtual city space, it is easy for a user to visually grasp the characteristics of a business listed on the permission list display 153 as seen from the user's point of view. A map may display the layout of city space in a virtual space and/or make divisions in the virtual space categorized by type of store in the virtual space, or it may be city space laid out in a manner preferred by the user. In FIG. 16B, the permission list display 163 and the candidate product list display 154 are displayed mixed together.

Figure 17B:
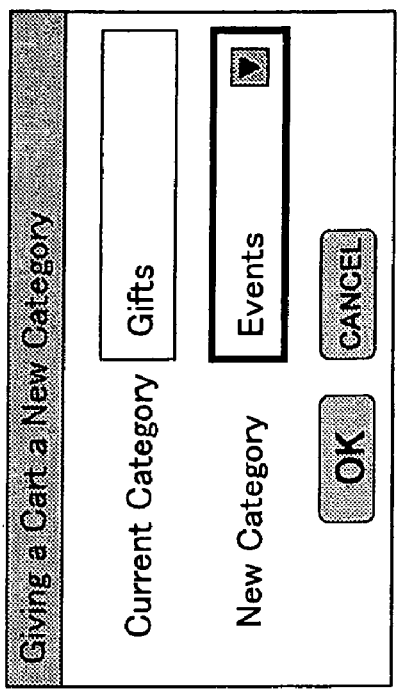
FIG. 17B is a view of a category name input window in accordance with a first embodiment of the present invention.
Figure 17A:
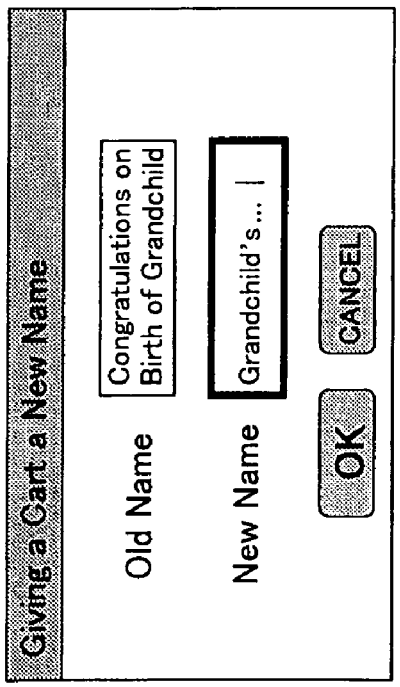
FIG. 17A is a view of a cart name input window in accordance with a first embodiment of the present invention.

FIG. 17A is an example of a screen displayed when a cart name is changed. FIG. 17B is an example of a screen when a cart category is changed. For example, when the cart name and category name in the screen shots shown in FIGS. 15A, 15B, 16A and 16B are clicked, these windows are displayed. A user can choose any cart name that he wishes. The category name is selected from among such names on a predetermined category list. Activating the arrow button in the field for inputting category name causes a pull-down menu for the category list to be displayed.

Figure 18B:
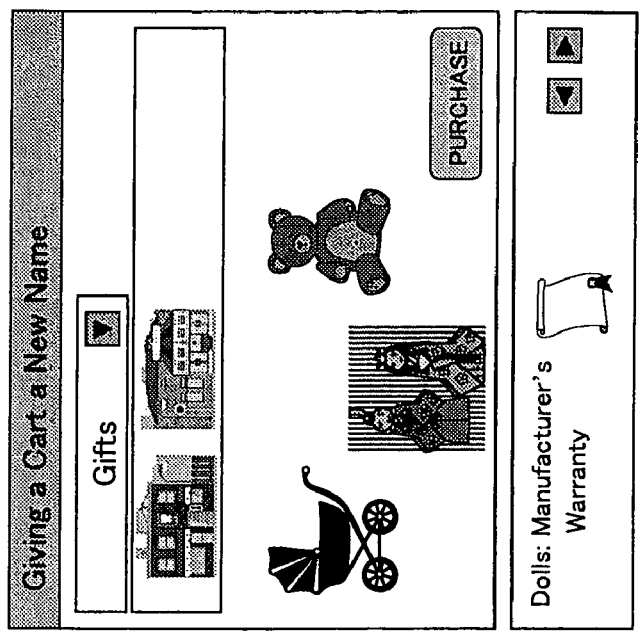
FIG. 18B is a view of a screen shot in which the prospective purchase items and purchase items are distinguished by icon display in accordance with a first embodiment of the present invention.
Figure 18A:
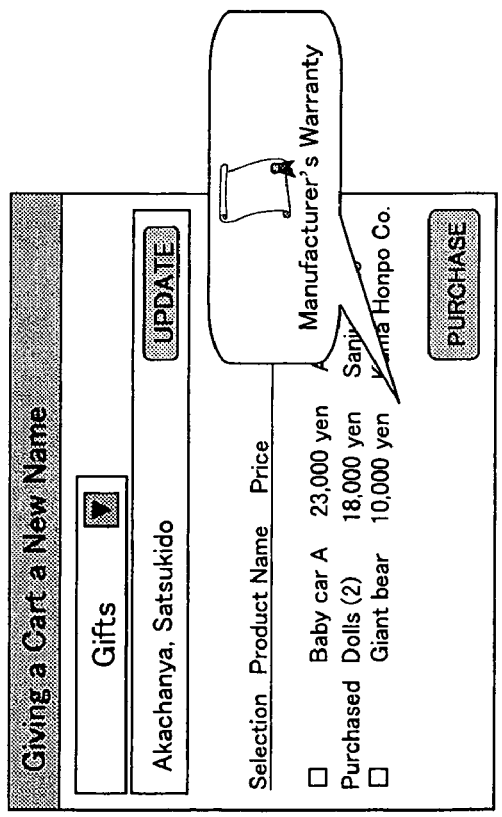
FIG. 18A is a view of a screen shot in which the prospective purchase items and purchase items are distinguished by text display in accordance with a first embodiment of the present invention.

FIGS. 18A and 18B are examples in which candidate products and purchased products are displayed in a manner such that they are distinguishable. In FIG. 18A, a "purchased" mark appears next to the purchased items "dolls, 2." In this figure, the manufacturer's warranty is provided as external information. In FIG. 18B, purchased items are indicated by having the icons for those items covered with shading. In this figure, the manufacturer's warranty is displayed in a separate frame.

Figure 19B:
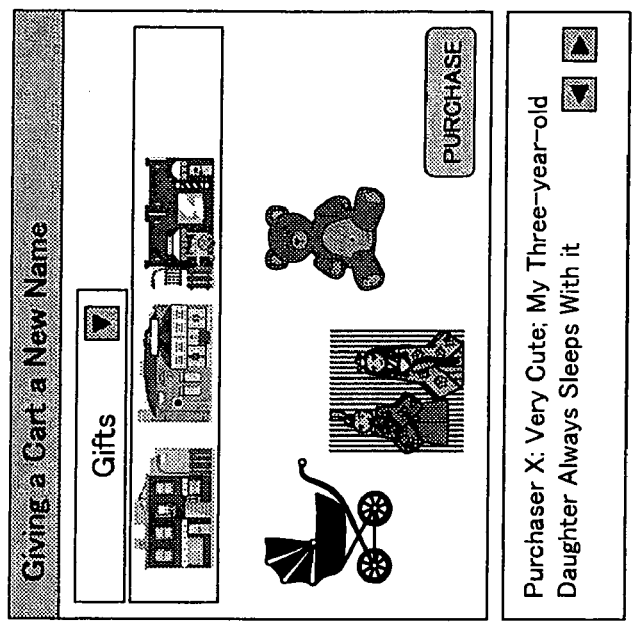
FIG. 19B is an alternate view of a computer screen illustrating an example of use of external information in accordance with a first embodiment of the present invention.
Figure 19A:
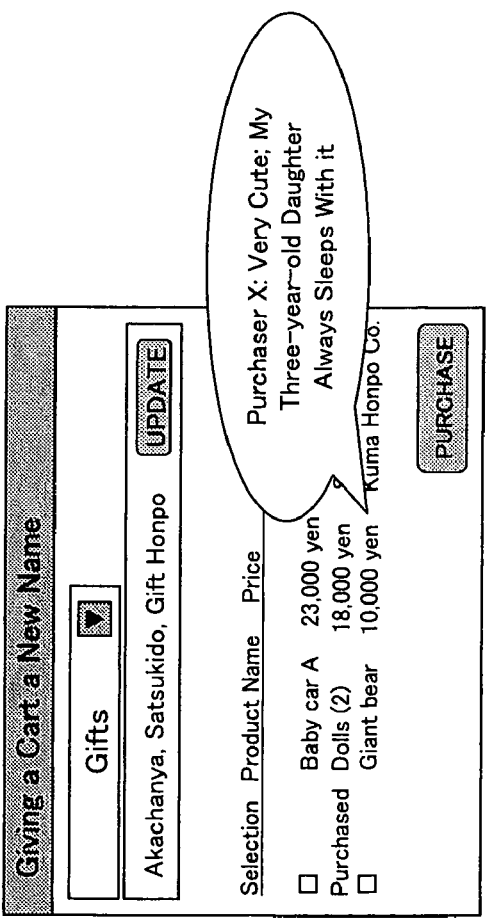
FIG. 19A is a view of a computer screen illustrating an example of use of external information in accordance with a first embodiment of the present invention.

FIGS. 19A and 19B show examples in which external information other than advertising is provided. In both figures, comments are displayed from a different user who purchased the same product. In FIG. 19A these comments are displayed in a balloon, and in FIG. 19B, in a separate frame. In such a manner, businesses can use the information they choose in order to encourage a user to make a purchase; no particular restriction is placed on this information, which can also be receipts, manuals, and the like.

Figure 20B:
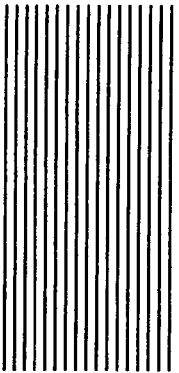
FIG. 20B is a view of a computer screen illustrating a second user receiving the transfer in accordance with a first embodiment of the present invention.
Figure 20A:
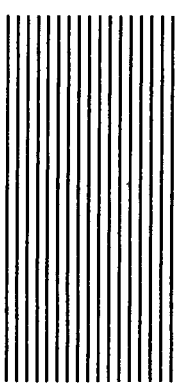
FIG. 20A is a view of a computer screen illustrating a first user transferring a cart to a second user in accordance with a first embodiment of the present invention.

FIGS. 20A and 20B are examples of screens that can be shown when a cart is sent to another person as a gift. In FIG. 20A, a web site 201 for the store Takatoriya and three frames for a cart 202 are displayed. This screen is an example in which, when a user has accessed the Takatoriya web site, both the web site and the contents of the user's cart are displayed on the same screen by the proxy 4.

To give a more detailed explanation, FIG. 20A shows a cart before transfer, in a case where two of the three gifts in the end-of-year gift corner have been selected as prospective gifts. Premium nori and the laundry detergent pack have been selected. If, in this state, a send button 203 is activated, a screen (not shown in figure) for designating, for example, the gift recipient and the credit card to be used for settlement appears. The user can designate the gift recipient and the type of credit card.

FIG. 20B is an example of a screen to be displayed to the user who is the recipient of the cart. The two products selected by the sender are displayed as candidate products. In addition, an advertisement that has come from the supplier of one of the products is shown. When the user selects the laundry detergent pack and activates a decision button 204, settlement will be performed using the credit card designated by the sender.

FIG. 21A and 21B show examples of screens in which the schedule column for one day forms a cart. At the very bottom of the window in this screen example, a permission list 211 is displayed. A user, by inputting "?→" after a set of characters, writes a request to the schedule column. In the example of FIG. 21A, the user is requesting an early morning seat on the Bullet Train and lodgings for that date. Businesses on the permission list 211 see this cart and make proposals for lodgings and Bullet Train tickets.

FIG. 21B is an example of a screen in which a proposal from a business is displayed. In this figure, the proposal and the business making the proposal are displayed in the portion of the schedule regarding which the request was made. A user can select proposals one by one, or he can purchase a set of proposals all at once. When the desired product in this screen is selected and a purchase button 212 is activated, the screen shown in FIG. 22 appears.

FIG. 22 shows an example of a screen after a user has purchased lodgings and transportation tickets. The purchased products are displayed in a position in the schedule corresponding to those products.

Figure 23:
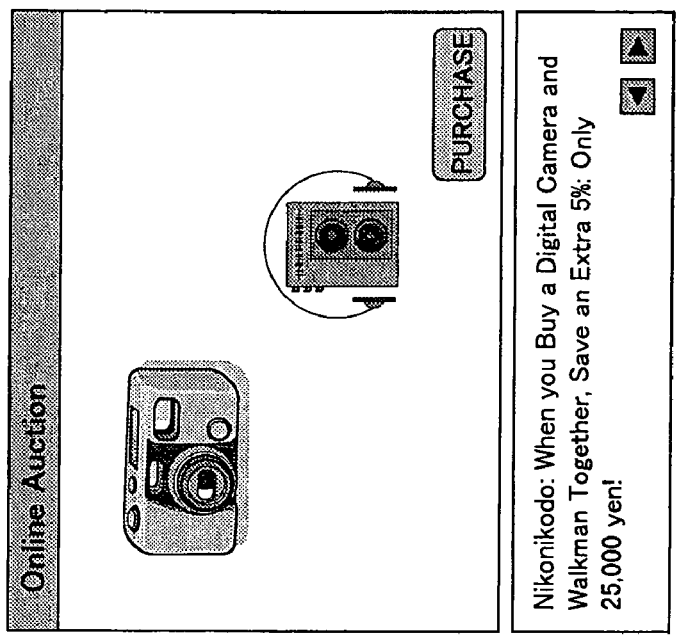
FIG. 23 is a view of a computer screen illustrating an example of the present invention applied to an online auction.

FIG. 23 shows an example of a screen in which a cart is used for an online auction. When a buyer places into a single cart a plurality of products that he desires, the seller of that plurality of products can propose a discount to the user for purchasing more than one item. In such a case, the permission list 136 is fixed by the owner of the auction site.

FIG. 24 is an example of the display of analysis information provided by the cart server 3. In this figure, number of units sold, lowest price, highest price, most common price, and store rankings are displayed for each article. Information relating to products registered on the candidate product list may be extracted from the created analysis information, and distributed to users' carts as external information. This makes it possible for a user to objectively determine whether current proposals from businesses are beneficial to him, thus heightening a user's desire to make a purchase.

Second Embodiment

Next, figures will be used to explain an online sales promotion system relating to a second embodiment of the present invention.

Figure 25:
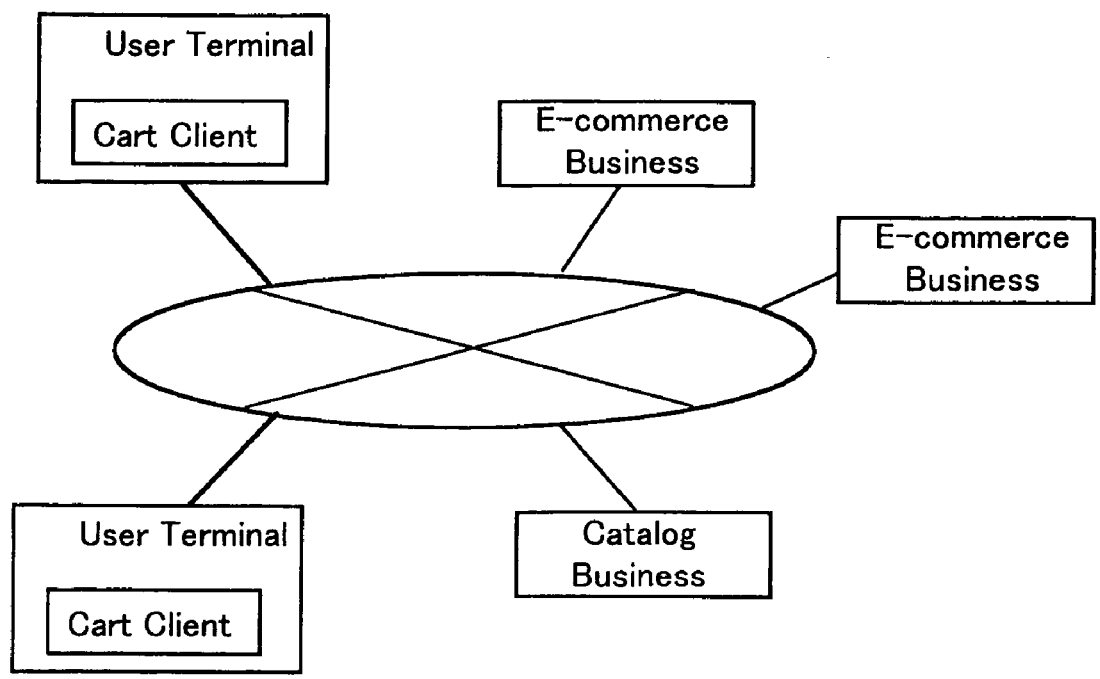
FIG. 25 is a block diagrammatical view of an online sale promotion system in accordance with a second embodiment of the present invention.

FIG. 25 is an overall block diagram of an online sales promotion system relating to the second embodiment. In this embodiment, no cart server 3 is provided, but a cart client having similar functions to the cart server 3 is provided at each user terminal 1. It is also conceivable that instead of loading a cart client at the user terminal 1, the functions of the cart client can be packaged as a plug-in to the WWW. In such a case, the cart client functions would be downloaded together with web pages.

For example, if a user accesses a web site corresponding to an online shopping cart, while the user is viewing that web site, an online shopping cart will be continuously displayed as part of those pages. Even if the user leaves the web site, when he returns to the site, the cart will reappear with the contents that it had prior to the user's leaving.

Figure 26:
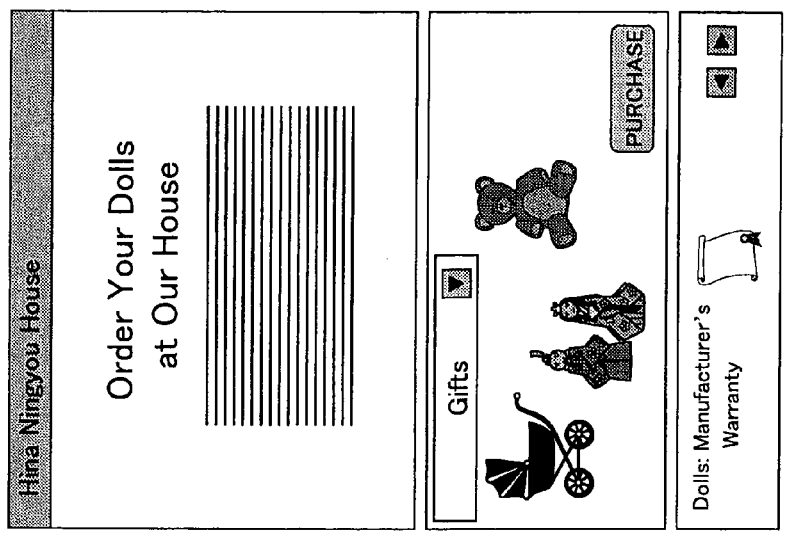
FIG. 26 is view of a computer screen illustrating a web site and cart contents in accordance with the second embodiment of the present invention.

FIG. 26 is an example of a screen displayed when a user accesses a web page that has a cart client packaged as a plug-in. As with FIG. 20, the web page and the cart contents are displayed in multiple frames.

Other Embodiments (A) When a new cart is created in the above embodiments, predetermined default values may be set up for the permission list, cart name and cart category. Predetermined default values may also be set for the candidate product list, the purchased product list, the external information list, and the permission list.

(B) In the above embodiments, the cart contents and the web page are displayed in separate frames, but other display formations may be used. For example, it is possible to display these in the form of banner ads embedded in web pages.

(C) In the above embodiments, the ad IDs are not displayed, but these may be displayed as part of the cart contents. For example, a user can give notification of an ad ID and make an inquiry to a business regarding an ID.

(D) The recording media on which a program that executes that above methods of the present invention are included in the present invention. These media include, but are not limited to, computer-readable and writable floppy diskettes, hard disks, semiconductor memory, CD-ROMS, DVDs, and MO disks.

By using this invention, a user can show to businesses the user designated contents of a cart, and can receive additional information, such as advertisements, from those businesses. The user can receive information from businesses he trusts about products in which he is interested. Businesses can know in what products a user is interested, Thus, they are able to employ more effective marketing strategies.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments set forth in the present invention is provided for illustration only, and not for the purpose of limiting the invention as defined by the appended claims and their equivalents.

What is claimed is:

1. An online sales promotion method used in a system to purchase a product over a network, said method comprising:
associating cart identification information with a first user;
receiving, from the first user, designation information of a third party product provider which the first user permits to view the cart identification information and to view product information which the first user associates with the cart identification information, and which provides a product related to the viewed product information as well as additional information related to the viewed product information, said third party product provider not having permission to view the cart identification and product information before receipt of the designation information;
associating and storing the designation information with the cart identification information;
receiving product information on said product from the first user;
associating said product information with the cart identification information;
notifying said third party product provider associated with said cart identification information of said cart identification information and product information in accordance with a receipt of designation information of said third party product provider or a receipt of said product information;
receiving additional information regarding the product identified by said product information, and the cart identification information, from said third party product provider;
determining whether the received additional information is from the third party product provider which the first user permits to view the cart identification information and to view the product information associated with the cart identification information;
associating said received additional information with said cart identification information according to the determination result; and
notifying said first user of said received product information and additional information.

2. An online sales promotion method in accordance with claim 1, further comprising:
associating settlement information of said user needed for a purchase of said product over said network with said cart identification information;
receiving an instruction for said purchase of said product from said first user; and
selling said product to said first user, using said settlement information.

3. An online sales promotion method in accordance with claim 2, further comprising:
storing whether or not said product is purchased; and
notifying said first user that said product is purchased or not purchased yet.

4. An online sales promotion method in accordance with claim 2, further comprising:
receiving an instruction for assignment and second user information on a second user from said first user; and
associating said second user with said cart identification information.

5. An online sales promotion method in accordance with claim 2, further comprising:
determining whether or not an incentive condition has been fulfilled based on said product information, designation information and settlement information, said incentive condition predetermined for awarding said first user for said purchase of said product; and
awarding said first user based on said determining.

6. An online sales promotion method in accordance with claim 1, further comprising:
notifying said product provider of said additional information.

7. An online sales promotion method in accordance with claim 1, further comprising:
notifying said product provider of competitor information on other product providers.

8. An online sales promotion method in accordance with claim 1, further comprising:
monitoring for an occurrence of a predetermined event based on said product information and designation information; and
notifying said product provider of said occurrence when said predetermined event occurs.

9. An online sales promotion method in accordance with claim 1, further comprising:
determining whether or not said product provider has fulfilled a fee charging condition based on said product information and designation information,
computing fee charging information for charging fees to said product provider which has fulfilled said fee charging condition; and
storing said fee charging information for invoicing said product provider.

10. An online sales promotion method in accordance with claim 1, further comprising:
computing a relationship between product and product price based on said product information; and
supplying said relationship to said first user and/or said product provider.

11. An online sales promotion apparatus used in a system to purchase a product over a network, said apparatus comprising:
means for associating cart identification information with a first user;
means for receiving, from the first user, designation information of a third party product provider which the first user permits to view the cart identification information and to view product information which the first user associates with the cart identification information, and which provides a product related to the viewed product information as well as additional information related to the viewed product information, said third party product provider not having permission to view the cart identification and product information before receipt of the designation information;

means for associating and storing the designation information with the cart identification information;

means for receiving product information on said product from the first user;

means for associating said product information with the cart identification information;

means for notifying said third party product provider associated with said cart identification information of said cart identification information and product information in accordance with a receipt of designation information of said third party product provider or a receipt of said product information;

means for receiving additional information regarding the product identified by said product information, and the cart identification information, from said third party product provider;

means for determining whether the received additional information is from the third party product provider which the first user permits to view the cart identification information and to view the product information associated with the cart identification information;

means for associating said received additional information with said cart identification information according to the determination result; and means for notifying said first user of said received product information and additional information.

12. A computer-readable recording medium whereon is recorded an online sales promotion program, for use in a system to purchase a product over a network, said program executes:

associating cart identification information with a first user;

receiving, from the first user, designation information of a third party product provider which the first user permits to view the cart identification information and to view product information which the first user associates with the cart identification information, and which provides a product related to the viewed product information as well as additional information related to the viewed product information, said third party product provider not having permission to view the cart identification and product information before receipt of the designation information;

associating and storing the designation information with the cart identification information;

receiving product information on said product from the first user;

associating said product information with the cart identification information;

notifying said third party product provider associated with said cart identification information of said cart identification information and product information in accordance with a receipt of designation information of said third party product provider or a receipt of said product information;

receiving additional information regarding the product indentified by said product information, and the cart identification information, from said third party product provider;

determining whether the received additional information is from the third party product provider which the first user permits to view the cart identification information and to view the product information associated with the care identification information;

associating said received additional information with said cart identification information according to the determination result;and notifying said first user of said received product information and additional information.

13. An online sales promotion method, comprising:

receiving, via a network, designation information designating one or more third party information-providing terminals which the first user permits to access a cart identifier associated with the first user, to access product information which the first user associates with the cart identifier, and to provide additional product information related to the accessed product information, from a first user terminal, said third party information-providing terminals not having permission to view the cart identifier and product information before receipt of said designation information;

storing in a first storage, in association with the cart identifier, the product information and the designation information;

sending the cart identifier and the product information associated therewith to the one or more designated third party information-providing terminals in accordance with a receipt of designation information of the one or more third party information-providing terminals or receipt of the product information;

receiving additional information regarding the product information, and the cart identifier, from any one of the designated third party information-providing terminals;

determining whether the received additional information is from the third party information-providing terminal which the first user permits to access the cart identifier and to access the product information associated with the cart identifier;

storing the received additional information in association with the cart identifier in a second storage according to the determination result; and sending to the first user terminal the product information and the additional information.

14. An online sales promotion method according to claim 13, further comprising:

associating and storing settlement information of the first user needed for a purchase of the product over the network with the cart identifier; and receiving a designation instruction and purchase of the product from the first user terminal.

15. An online sales promotion method according to claim 14, further comprising:

receiving from the first user terminal an assignment instruction of the cart identifier to a second user terminal; and rewriting the user terminal associated with the cart identifier from the first user terminal to the second user terminal.

16. An online sales promotion method in accordance with claim 14, further comprising:

storing an incentive condition for sending award information relating to a purchase of a product to the user terminals;

determining whether the incentive condition is met based on information associated with the cart identifier; and sending the award information to the first user terminal in accordance with the determination result.

17. An online sales promotion method in accordance with claim 13, further comprising:

monitoring an occurrence of a predetermined event based on information associated with the cart identifier; and notifying the designated information-providing terminal of the occurrence of predetermined event.

18. An online sales promotion method in accordance with claim 13, further comprising:
storing a charging condition for charging administrators of the information-providing terminals in the second storage; and
monitoring for an occurrence of an information-providing terminal that matches the charging condition based on information associated with the cart identifier, and upon a match, computing charging information for charging fee to an administrator of that information-providing terminal.

19. An online sales promotion method in accordance with claim 13, further comprising:
receiving a designation of one or more information-providing terminals and the product from one or more user terminals other than the first user terminal;
storing by a first storage of product information for each information-providing terminal; and
extracting and analyzing the product information that includes a price of the product, computing an analysis result indicating relationship between the product and the price of the product, and sending the result to the first user terminal and/or the information-providing terminals that the first user terminal has designated.

20. An online sales promotion device, comprising:
a first acceptance unit to receive, via a network, designation information designating one or more third party information-providing terminals which the first user permits to access a cart identifier associated with the first user, to access product information which the first user associates with the cart identifier, and to provide additional product information related to the accessed product information, from a first user terminal, said third party information-providing terminals not having permission to view the cart identifier and product information before receipt of the designation information;
a first storage unit to store, in association with the cart identifier, the product information and the designation information;
a first notification unit to send to the designated third party information-providing terminals the cart identifier and the product information associated therewith in accordance with a receipt of designation information of the one or more third party information-providing terminals or receipt of the product information;
a second acceptance unit to send additional information regarding the product information, and the cart identifier, from any one of the designated third party information-providing terminals;
a determining unit to determine whether the received additional information is from the third party information-providing terminal which the first user permits to access the cart identifier and to access the product information associated with the cart identifier;
a second storage unit to store the received additional information in association with the cart identifier according to the determination result; and
a second notification unit to send to the first user terminal the product information and the additional information.

21. A computer-readable recording medium storing a program to perform online sales promotion, by:
receiving via a network, designation information designating one or more third party information-providing terminals which the first user permits to access a cart identifier associated with the first user and to access product information which the first user associates with the cart identifier, and to provide additional product information related to the accessed product information, from a first user terminal, said third party information-providing terminals not having permission to view the cart identifier and product information before receipt of the designation information;
storing, by a first storage, in association with the cart identifier, the product information and the designation information;
sending the cart identifier and product information associated therewith to the designated third party information-providing terminals in accordance with a receipt of designation information of the one or more third party information-providing terminals or receipt of the product information;
receiving from any one of the designated third party information-providing terminals additional information regarding the product information, and the cart identifier;
determining whether the received additional information is from the third party information-providing terminal which the first user terminal permits to access the cart identifier and to access the product information associated with the cart identifier;
storing in a second storage the received additional information in association with the cart identifier according to the determination result; and
sending to the first user terminal the product information and the additional information.

22. An online sales promotion method, comprising:
associating product information and designation information, designating a third party that the first user permits to access the product information and supply additional product information, with cart identification information of a first user, said third party not having permission to view the cart identification and product information before receipt of the designation information from the first user;
providing the cart identification information and the product information to the third party;
receiving the additional information and the cart identification information from the third party;
determining whether the received additional information is from the third party which the first user permits to access the product information and supply the additional product information;
associating the additional information with the cart identification information according to the determination results; and
providing the associated information to the first user.

23. The online sales promotion method according to claim 22, further comprising:
associating settlement information needed for a purchase of the product with the cart identification information; and
selling the product to the first user, using the settlement information.

24. An online sales promotion method according to claim 22, further comprising:
receiving an instruction from the first user to assign information to a second user; and
associating the second user with the cart identification information.

25. An online sales promotion method in accordance with claim 22, further comprising awarding an incentive upon determination that an incentive condition is fulfilled.

* * * * *

UNITED STATES PATENT AND TRADEMARK OFFICE
CERTIFICATE OF CORRECTION

| | | |
|---|---|---|
| PATENT NO. | : 7,953,629 B2 | Page 1 of 1 |
| APPLICATION NO. | : 09/766646 | |
| DATED | : May 31, 2011 | |
| INVENTOR(S) | : Youji Kohda et al. | |

It is certified that error appears in the above-identified patent and that said Letters Patent is hereby corrected as shown below:

Column 21, Line 60, in claim 12, delete "indentified" and insert -- identified --, therefor.

Column 21, Line 66, in claim 12, delete "care" and insert -- cart --, therefor.

Column 22, Line 3, in claim 12, delete "result;and" and insert -- result; and --, therefor.

Signed and Sealed this
Thirty-first Day of January, 2012

David J. Kappos
*Director of the United States Patent and Trademark Office*